(12) United States Patent
Yasukawa et al.

(10) Patent No.: US 11,412,480 B2
(45) Date of Patent: Aug. 9, 2022

(54) USER EQUIPMENT AND SIGNAL TRANSMISSION METHOD

(71) Applicant: NTT DOCOMO, INC., Tokyo (JP)

(72) Inventors: Shinpei Yasukawa, Tokyo (JP); Satoshi Nagata, Tokyo (JP); Qun Zhao, Beijing (CN); Jing Wang, Beijing (CN); Huan Wang, Beijing (CN); Liu Liu, Beijing (CN); Anxin Li, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/323,555

(22) PCT Filed: Aug. 10, 2017

(86) PCT No.: PCT/JP2017/029226
§ 371 (c)(1),
(2) Date: Feb. 6, 2019

(87) PCT Pub. No.: WO2018/030541
PCT Pub. Date: Feb. 15, 2018

(65) Prior Publication Data
US 2019/0208504 A1   Jul. 4, 2019

(30) Foreign Application Priority Data
Aug. 10, 2016   (JP) .............................. JP2016-158269

(51) Int. Cl.
*H04W 72/02*   (2009.01)
*H04W 92/18*   (2009.01)
(Continued)

(52) U.S. Cl.
CPC ........... *H04W 72/02* (2013.01); *H04W 24/10* (2013.01); *H04W 74/0816* (2013.01); *H04W 92/18* (2013.01); *H04W 4/40* (2018.02)

(58) Field of Classification Search
CPC ....... H04W 4/40; H04W 24/10; H04W 72/02; H04W 74/0816; H04W 92/18
See application file for complete search history.

(56) References Cited

U.S. PATENT DOCUMENTS

| | | | |
|---|---|---|---|
| 2017/0118771 A1* | 4/2017 | Kazmi | H04W 74/0808 |
| 2019/0116586 A1* | 4/2019 | Basu Mallick | H04W 72/048 |
| 2019/0182840 A1* | 6/2019 | Feng | H04W 72/06 |

FOREIGN PATENT DOCUMENTS

WO   2015/021185 A1   2/2015

OTHER PUBLICATIONS

Huawei et al., UE Autonomous Resource Selection, 3GPP TSG RAN WG1 Meeting #84, R1-160307, St Julian's, Malta, Feb. 15-19, 2016 (Year: 2016).*

(Continued)

*Primary Examiner* — Brian P Cox
(74) *Attorney, Agent, or Firm* — Osha Bergman Watanabe & Burton LLP

(57) ABSTRACT

A user equipment including: a selection unit that selects, based on a result of sensing performed in a first time window and on a transmission interval of a signal, one or more resource candidates in a second time window after the first time window; and a transmission unit that selects a resource for transmitting a signal from the selected one or more resource candidates, and transmits the signal.

3 Claims, 20 Drawing Sheets

(51) Int. Cl.
*H04W 24/10* (2009.01)
*H04W 74/08* (2009.01)
*H04W 4/40* (2018.01)

(56) References Cited

OTHER PUBLICATIONS

International Search Report issued in PCT/JP2017/029226 dated Oct. 31, 2017 (4 pages).
Written Opinion of the International Searching Authority issued in PCT/JP2017/029226 dated Oct. 31, 2017 (4 pages).
LG Electronics; "Summary of Tuesday offline discussions on V2V"; 3GPP TSG RAN WG1 Meeting #85, R1-165608; Nanjing, China; May 23-27, 2016 (3 pages).
Intel Corporation; "Discussion on sensing aspects to support V2V communication with different transmission periodicity"; 3GPP TSG RAN WG1 Meeting #85, R1-165073; Nanjing, China; May 23-27, 2016 (7 pages).
Bertenyi B.; "Key drivers for LTE success: Services Evolution," Sep. 2011, 3GPP, Internet URL: http://www.3gpp.org/ftp/Information/presentations/presentations_2011/2011_09_LTE_Asia/2011_LTE-Asia_3GPP_Service_evolution.pdf (15 pages).
3GPP TS 36.300 V13.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Dec. 2015 (290 pages).
Japanese Office Action issued in Japanese Application No. 2016-158269 dated Oct. 24, 2017 (6pages).
Extended European Search Report issued in European Application No. 17839605.7, dated Nov. 25, 2019 (7 pages).
Extended European Search Report issued in counterpart European Patent Application No. 21161758.4, dated Jun. 16, 2021 (10 pages).
NTT Docomo; "Discussion on details of sensing with semi-persistent transmission"; 3GPP TSG RAN Meeting #84bis, R1-163176; Busan, Korea; Apr. 11-15, 2016 (6 pages).
NTT Docomo, Inc; "Transmitter UE behaviour for sensing-based resource allocation"; 3GPP TSG RAN WG1 Meeting #85, R1-165192; Nanjing, China; May 23-27, 2016 (7 pages).
ZTE; "Discussion on V2V SPS resource scheme"; 3GPP TSG-RAN WG1 Meeting #84bis, R1-162413; Busan, Korea Apr. 11-15, 2016 (6 pages).
Office Action issued in counterpart Chinese Application No. 201780057380.4 dated Aug. 2, 2021 (17 pages).

\* cited by examiner

USER EQUIPMENT AND SIGNAL TRANSMISSION METHOD

TECHNICAL FIELD

The present invention relates to a user equipment and a signal transmission method.

BACKGROUND ART

A device to device (D2D) technology, in which user equipments perform a direct communication without through a radio base station, has been examined in long term evolution (LTE) and a succession system (for example, LTE-Advanced (LET-A), 4G, future radio access (FRA), 5G, and the like) of the LTE (for example, Non-Patent Document 1).

The D2D can reduce congestion between a user equipment and a base station, or can realize a communication between user equipments even in a case where the base station enters a communication impossible state at the time of disaster and the like.

The D2D is largely classified into a D2D discovery that discovers another user equipment that can establish a communication, and a D2D communication (also referred to as "D2D direct communication" and "terminal-to-terminal direct communication") in which a direct communication is performed between user equipments. In the following description, when not being particularly distinguished, the D2D communication, the D2D discovery, and the like are simply referred to as "D2D". In addition, a signal that is transmitted and received with the D2D is referred to as "D2D signal".

In addition, in a 3rd generation partnership project (3GPP), realization of V2X through extension of a D2D function has been examined. Here, the V2X is a part of intelligent transport systems (ITS), and is a general term of a vehicle to vehicle (V2V) that represents a communication type performed between vehicles, a vehicle to infrastructure (V2I) that represents a communication type performed between a vehicle and a road-side unit (RSU) that is provided on a roadside, a vehicle to nomadic device (V2N) that represents a communication type performed between a vehicle and a mobile terminal of a driver, and a vehicle to pedestrian (V2P) that represents a communication type performed between a vehicle and a mobile terminal of a pedestrian as illustrated in FIG. 1.

CITATION LIST

Non-patent Document

Non-Patent Document 1: "Key drivers for LTE success: Services Evolution", September 2011, 3GPP, internet URL: http://www.3gpp.org/ftp/Information/presentations/presentat ions_2011/2011_09_LTE_Asia/2011_LTE-Asia_3GPP_Service_evolution.pdf Non-Patent Document 2: 3GPP TS 36.300 V13.2.0 (2015-12)

SUMMARY OF THE INVENTION

Problem to be Solved by the Invention

The V2X technology is based on the D2D technology defined in LTE. In the D2D technology, a mode in which a user equipment selects a resource with which a D2D signal is transmitted is largely classified into a mode in which the resource is dynamically allocated from a base station, and a mode in which the user equipment autonomously selects the resource. In the V2X, particularly, in the V2V, the user equipment (for example, a vehicle) exists in a high density, and moves at a high speed, and thus the mode in which the resource is dynamically allocated is not efficient. Accordingly, it is assumed that the mode in which the user equipment autonomously selects the resource is used. In addition, in the V2X, it is also assumed that the user equipment reserves a future transmission resource and transmits the D2D signal by using the reserved resource so as to realize periodic data transmission.

Here, when a plurality of user equipments autonomously select (including reselection) a transmission resource, if each of the user equipments freely selects and reserves the resource, collision of resources occurs, and thus a user equipment on a reception side cannot appropriately receive a signal. Here, in 3GPP, a sensing-based resource selection mode, in which sensing of a resource is performed, and selection of a resource that is not used or reserved (may be referred to as "occupied"), is proposed.

Here, particularly, in the V2V, for example, it is assumed that data is transmitted in a period such as an interval of 100 ms and an interval of 500 ms. Accordingly, when selecting a resource on the basis of a sensing result, it is preferable that the user equipment selects a resource in consideration of a data transmission interval that is desired. However, in the sensing-based resource selection mode that is proposed in current 3GPP, a transmission interval of a signal that is transmitted is not considered. That is, in the current resource selection mode, first data transmission can be performed with a resource that is selected, but in second or later data transmission, there is a problem that resources may collide with each other.

A technology that is disclosed has been made in consideration of the above-described circumstances, and an object thereof is to provide a technology capable of suppressing signal collision in a mode of selecting a resource for signal transmission on the basis of a sensing result.

Means for Solving Problem

According to a technology that is disclosed, there is provided a user equipment including:

a selection unit that selects, based on a result of sensing performed in a first time window and on a transmission interval of a signal, one or more resource candidates in a second time window after the first time window; and a transmission unit that selects a resource for transmitting a signal from the selected one or more resource candidates, and transmits the signal.

EFfect of the Invention

According to the technology that is disclosed, it is possible to provide a technology capable of suppressing signal collision in a mode of selecting a resource for signal transmission on the basis of a sensing result.

MODE(S) FOR CARRYING OUT THE INVENTION

Hereinafter, an embodiment of the invention will be described with reference to the accompanying drawings. Furthermore, the following embodiment is illustrative only, and an embodiment to which the invention is applied is not limited to the following embodiment. For example, in a radio communication system according to this embodiment, a system of a mode in conformity to LTE is assumed, but the invention is applicable to other modes without limitation to the LTE. Furthermore, in this specification and claims, "LTE" is used in broad meaning including not only a communication mode corresponding to Release 8 or 9 of 3GPP but also a fifth generation communication mode corresponding to Release subsequent to Release 10, 11, 12, 13, or 14 of the 3GPP.

In addition, description of this embodiment is mainly given of a V2X, but the technology according to this embodiment is also widely applicable to the whole D2D without limitation to the V2X. In addition, meaning of the "D2D" includes the V2X. In addition, a term of the "D2D" represents the whole inter-terminal communications without limitation to the D2D in LTE.

In addition, the "D2D" is used in broad meaning including a procedure of transmitting and receiving a D2D signal between user equipments UE, a procedure of receiving (monitoring) the D2D signal by a base station, and a procedure of transmitting an uplink signal to a base station eNB by each of the user equipments UE in a case of RRC idle or in a case where connection with the base station eNB is not established.

<Overview of D2D>

First, description will be given of an overview of the D2D defined in LTE. Furthermore, the technology of the D2D to be described here can be used even in the V2X, and the user equipment UE in the embodiment of the invention can execute transmission and reception of the D2D signal according to the technology.

Figure 1:
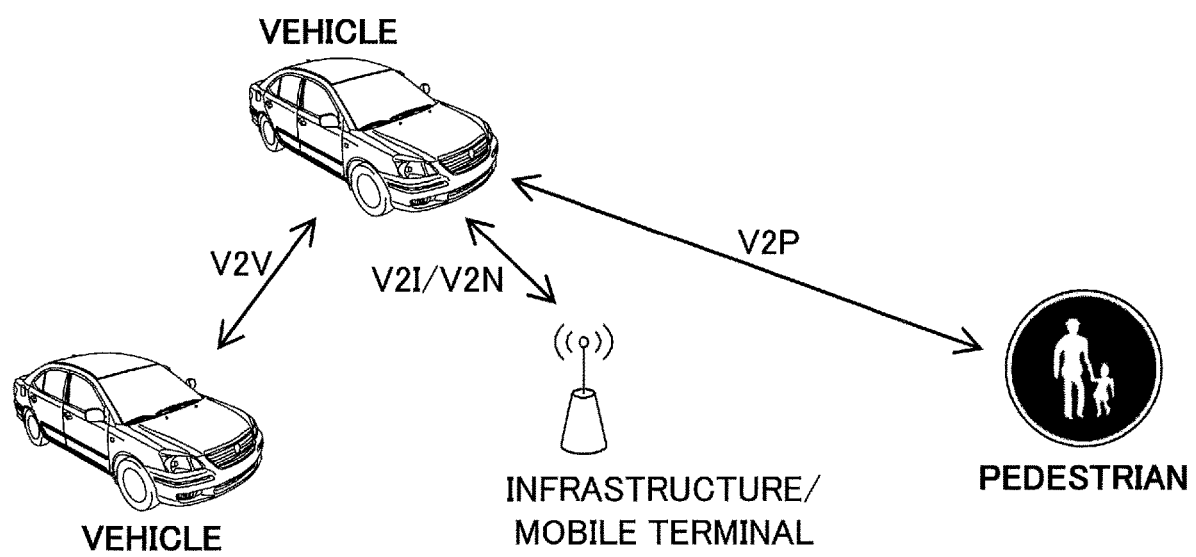
FIG. 1 is a view illustrating a V2X.
Figure 2A:
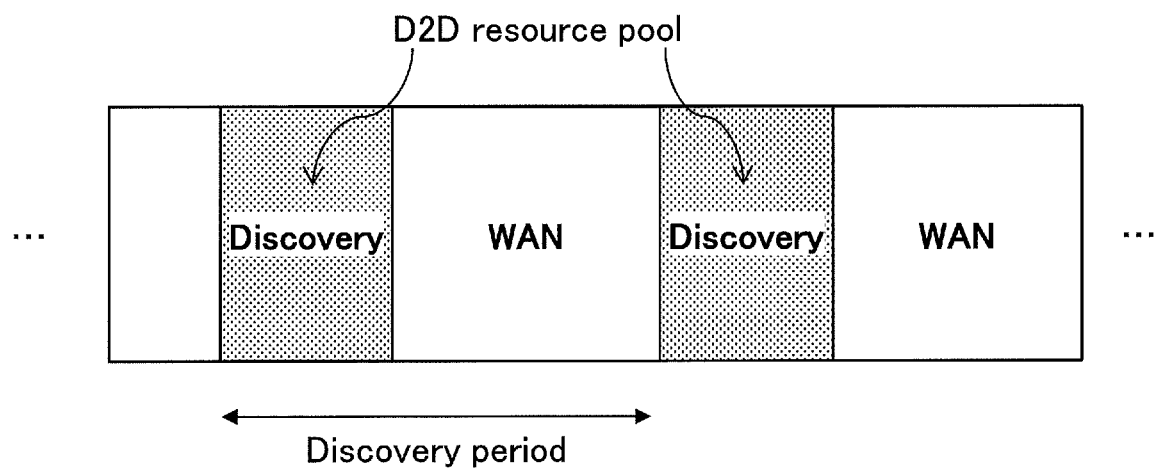
FIG. 2A is a view illustrating a D2D.

As described above, the D2D is largely classified into "D2D discovery" and "D2D communication". With regard to the "D2D discovery", as illustrated in FIG. 2A, a resource pool for a discovery message is secured for each discovery period (also referred to as physical sidelink discovery channel (PSDCH) period), and the user equipment UE transmits a discovery message (discovery signal) in the resource pool. Detailed examples include Type 1 and Type 2B. In Type 1, the user equipment UE autonomously selects a transmission resource in a resource pool. In Type 2b, a quasi-static resource can be allocated through higher layer signaling (for example, an RRC signal).

Figure 2B:
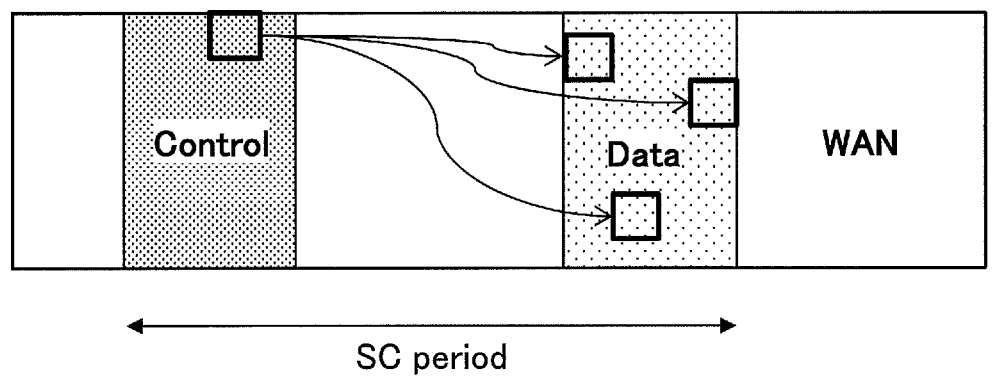
FIG. 2B is a view illustrating a D2D.

With regard to the "D2D communication", as illustrated in FIG. 2B, a resource pool for sidelink control information (SCI)/data transmission is periodically secured. A transmission-side user equipment UE notifies a reception side of a resource for data transmission and the like by using an SCI with a resource that is selected in a control resource pool (physical sidelink control channel (PSCCH) resource pool), and transmits data with a resource for data transmission. More specific examples of the "D2D communication" include Mode 1 and Mode 2. In the Mode 1, a resource can be dynamically allocated with (enhanced) physical downlink control channel (E)PDCCH that is transmitted to a user equipment UE from a base station eNB. In Mode 2, the user equipment UE autonomously selects a transmission resource from a resource pool. As the resource pool, a resource pool, which is notified with a system information block (SIB) or which is defined in advance, is used.

In LTE, a channel that is used in the "D2D discovery" is referred to as a PSDCH, a channel with which control information such as the SCI is transmitted in the "D2D communication" is referred to as a PSCCH, and a channel with which data is transmitted is referred to as a physical sidelink shared channel (PSCCH).

Figure 3:
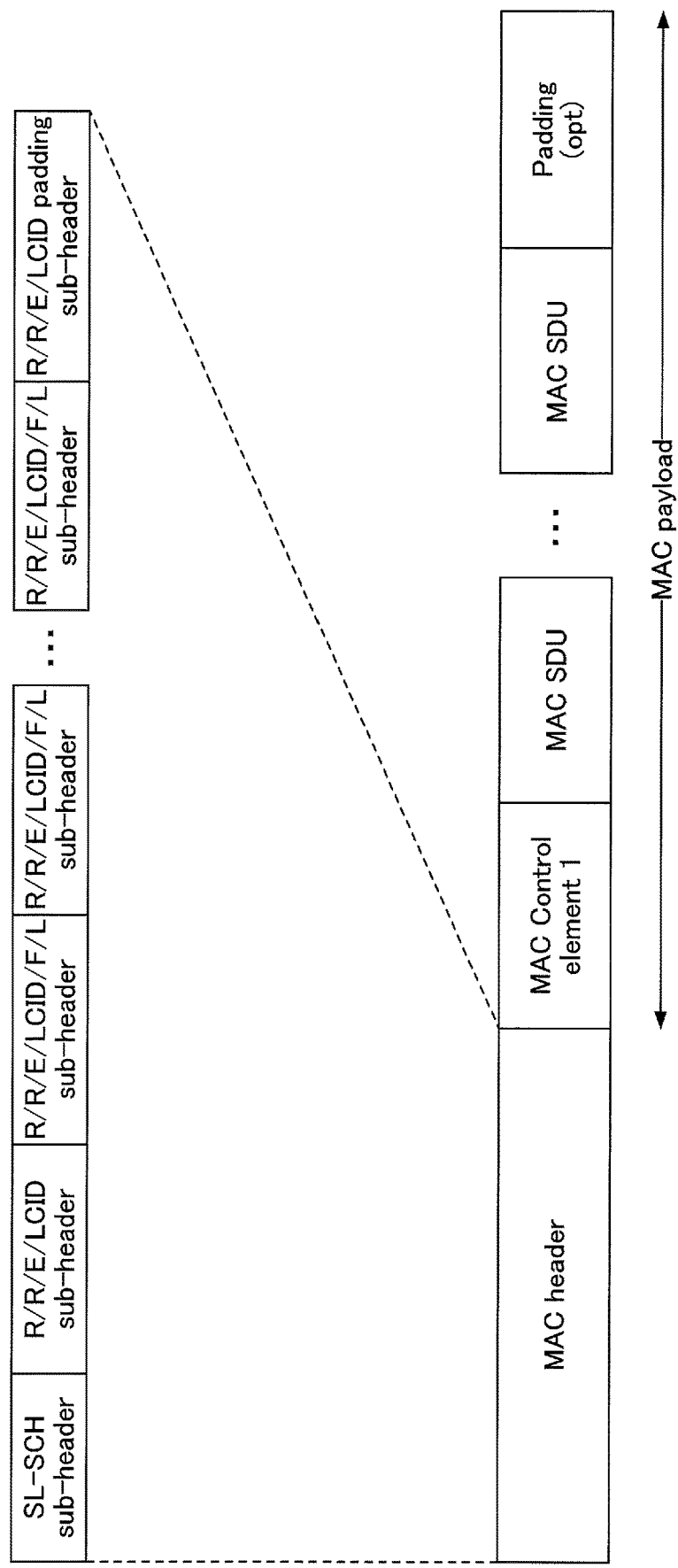
FIG. 3 is a view illustrating a MAC PDU that is used in a D2D communication.

As illustrated in FIG. 3, a medium access control (MAC) protocol data unit (PDU) that is used in a communication of the D2D is constituted by at least a MAC header, a MAC control element, a MAC service data unit (SDU), and a padding. The MAC PDU may include other pieces of information. The MAC header is constituted by one sidelink shared channel (SL-SCH) subheader, and one or more MAC PDU suheaders.

Figure 4:
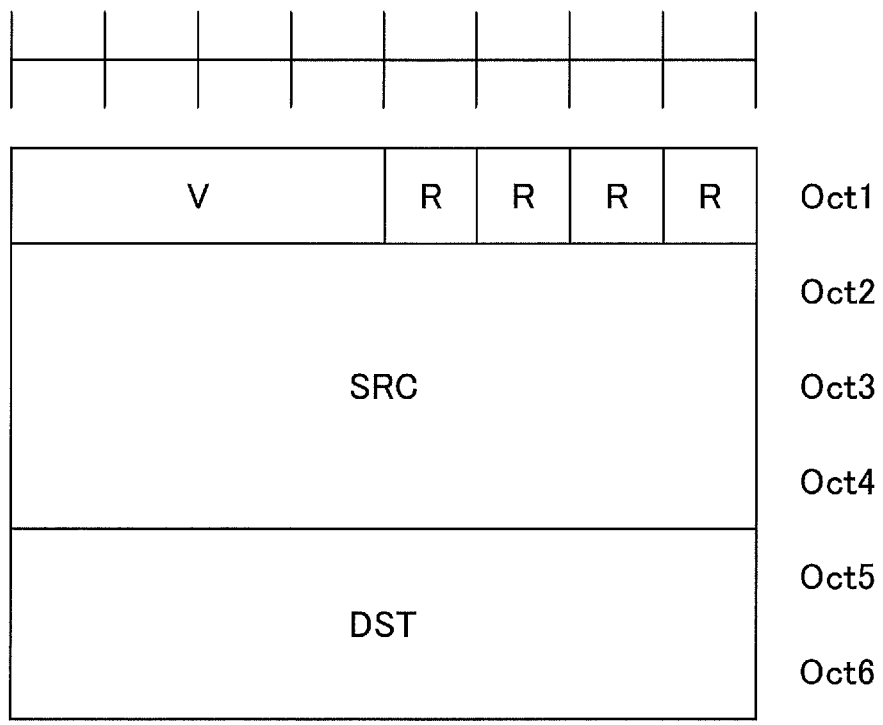
FIG. 4 is a view illustrating a format of an SL-SCH subheader.

As illustrated in FIG. 4, the SL-SCH subheader is constituted by a MAC PDU format version (V), transmission source information (SRC), transmission destination information (DST), a reserved bit (R), and the like. V represents a MAC PDU format version that is allocated to a leading portion of the SL-SCH subheader and is used by a user equipment UE. Information related to a transmission source is set in the transmission source information. An identifier related to a ProSe UE ID may also be set in the transmission source information. Information related to a transmission destination is set in the transmission destination information. Information related to a ProSe Layer-2 Group ID may also be set in the transmission destination information.

Figure 5:
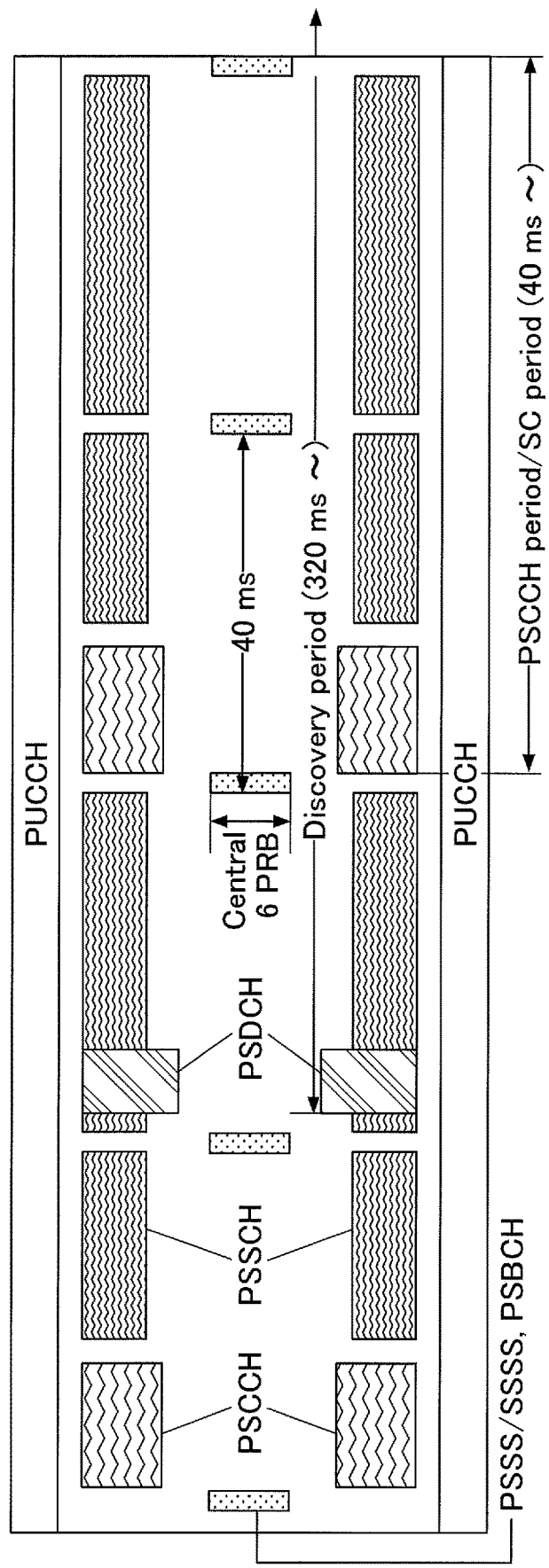
FIG. 5 is a view illustrating an example of a channel structure that is used in the D2D.

An example of a channel structure of the D2D is illustrated in FIG. 5. As illustrated in FIG. 5, a PSCCH resource pool and a PSSCH resource pool which are used in the "D2D communication" are allocated. In addition, a PSDCH resource pool that is used in the "D2D discovery" is allocated in a period that is longer than a period of a channel of the "D2D communication".

In addition, as a synchronization signal for the D2D, a primary sidelink synchronization signal (PSSS) and a secondary sidelink synchronization signal (SSSS) are used. In addition, for example, a physical sidelink broadcast channel (PSBCH), which is used to transmit notification information (broadcast information) such as a system band of the D2D, a frame number, and resource configuration information, is used for an operation other than coverage.

Figure 6A:
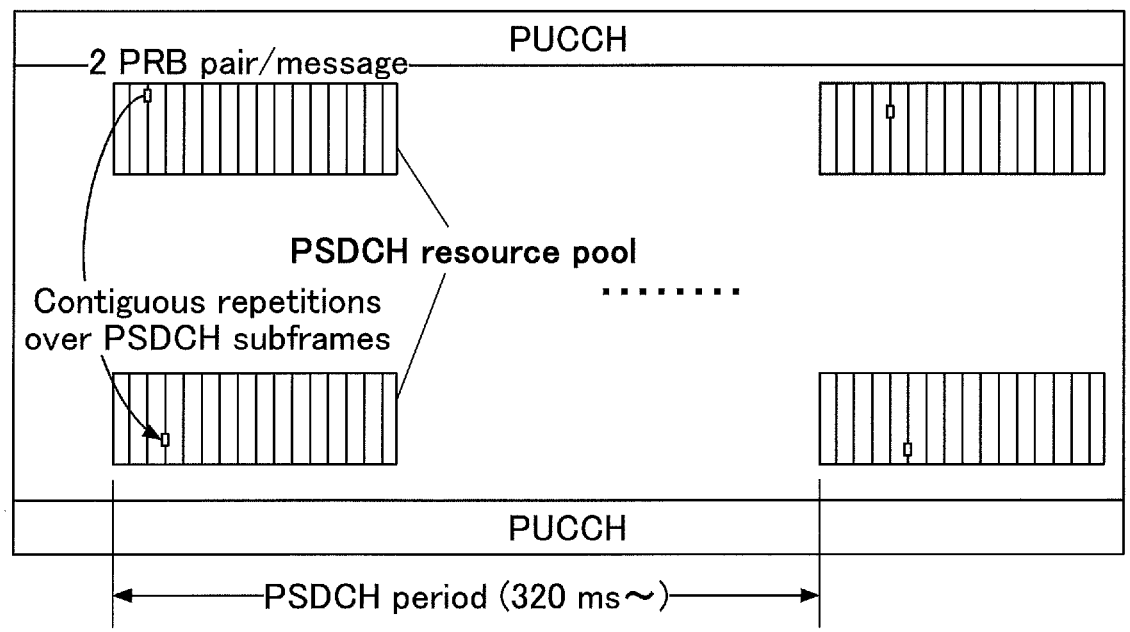
FIG. 6A is a view illustrating a structure example of a PSDCH.
Figure 6B:
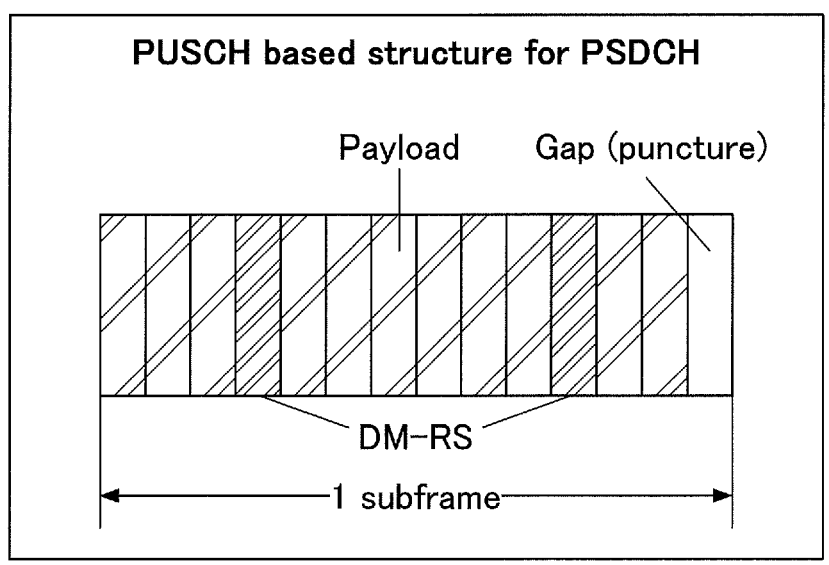
FIG. 6B is a view illustrating a structure example of a PSDCH.

FIG. 6A illustrates an example of the PSDCH resource pool that is used in the "D2D discover". The resource pool is set with a bitmap of a subframe, and thus the resource pool becomes a resource pool with an image as illustrated in FIG. 6A. This is also true of resource pools of other channels. In addition, in the PSDCH, repetitive transmission (repetition) is performed while performing frequency hopping. The number of repetition times can be set to, for example, 0 to 3. In addition, as illustrated in FIG. 6B, the PSDCH has a PUSCH-based structure, and has a structure in which a demodulation reference signal (DM-RS) is inserted.

Figure 7A:
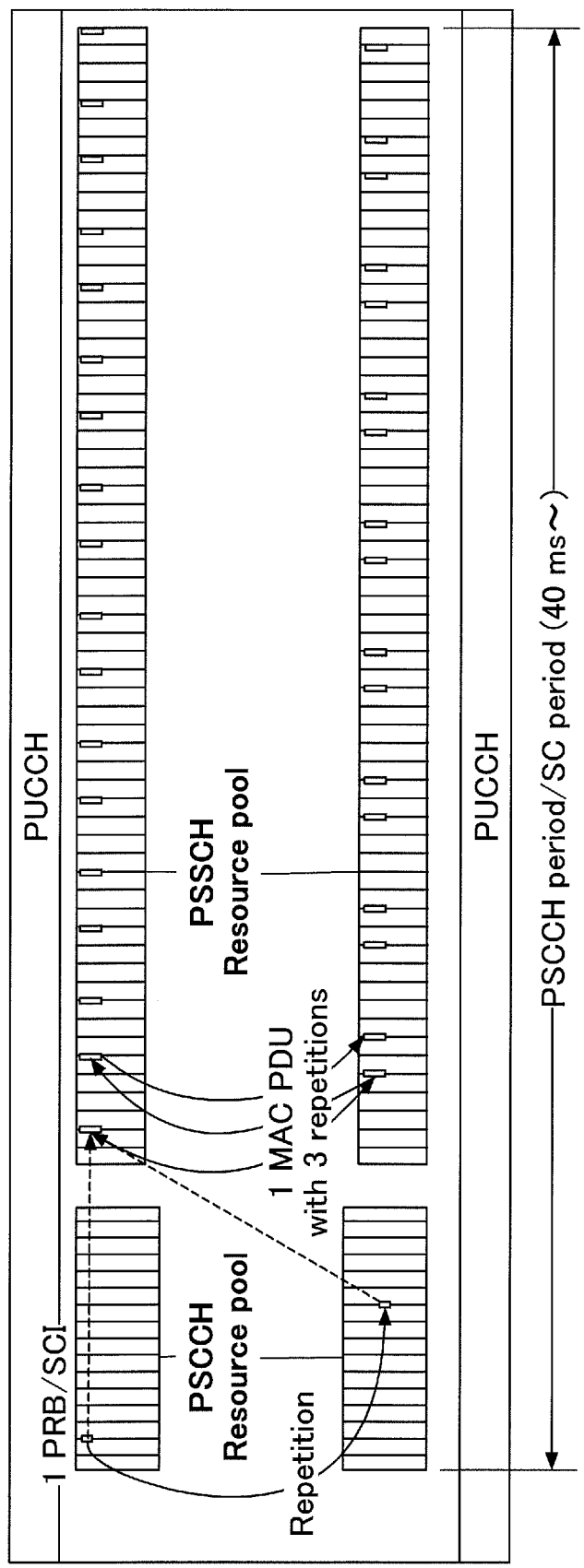
FIG. 7A is a view illustrating a structure example of a PSCCH and a PSSCH.
Figure 7B:
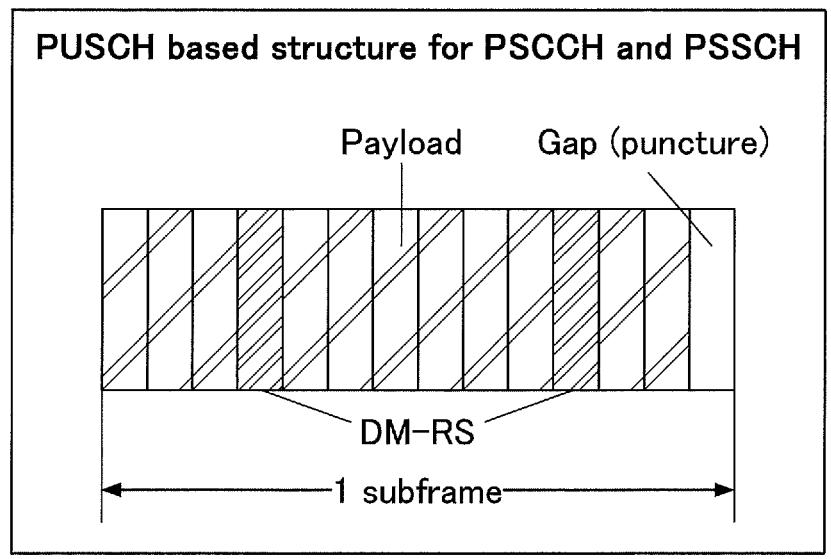
FIG. 7B is a view illustrating a structure example of a PSCCH and a PSSCH.

FIG. 7A illustrates an example of the PSCCH resource pool and the PSSCH resource pool which are used in the "D2D communication". As illustrated in FIG. 7A, in the PSCCH, repetitive transmission (repetition) is performed once while performing the frequency hopping. In the PSSCH, repetitive transmission (repetition) is performed three times while performing the frequency hopping. In addition, as illustrated in FIG. 7B, the PSCCH and the PSSCH have a PUSCH-based structure, and has a structure in which the DM-RS is inserted.

Figure 8A:
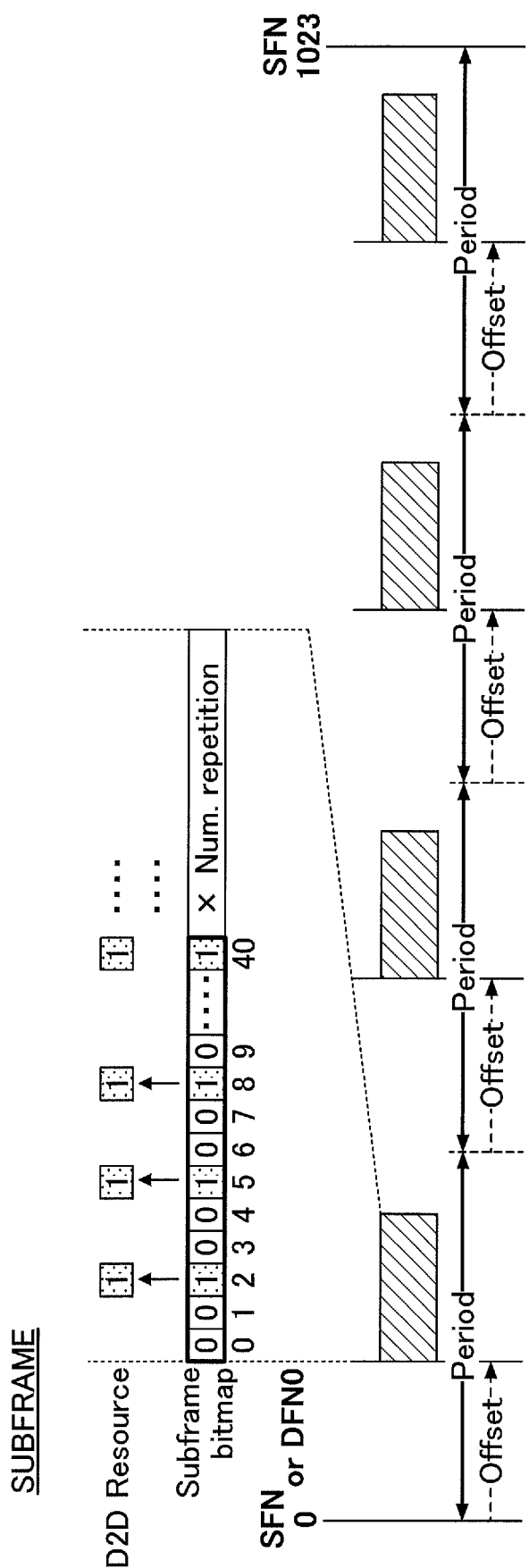
FIG. 8A is a view illustrating a resource pool configuration.
Figure 8B:
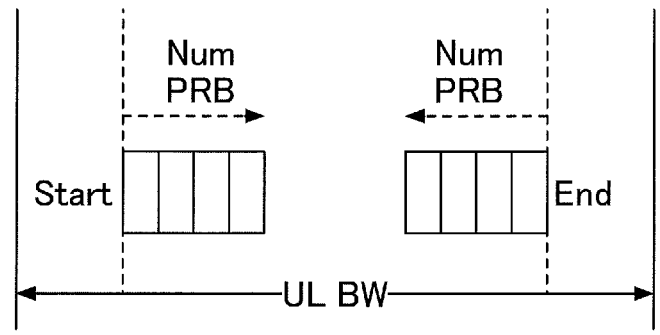
FIG. 8B is a view illustrating a resource pool configuration.

FIGS. 8A and 8B illustrate an example of a resource pool configuration in the PSCCH, the PSDCH, and the PSSCH (Mode 2). As illustrated in FIG. 8A, in a time direction, a resource pool is expressed as a subframe bitmap. Furthermore, the bitmap is repeated by the number of times of num.reprtition. In addition, an offset, which indicates an initiation position in each period, is designated.

In a frequency direction, contiguous allocation and non-contiguous allocation can be performed. FIG. 8B illustrates an example of the non-contiguous allocation. As illustrated in the drawing, an initiation PRB, a termination PRB, and the number of PRBs (numPRB) are designated.

<System Configuration>

Figure 9:
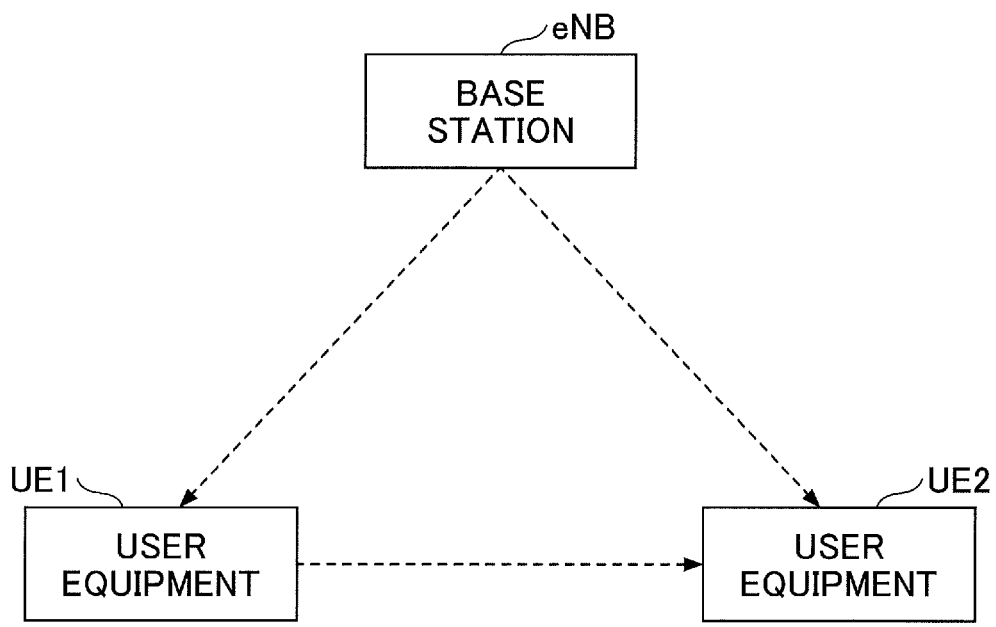
FIG. 9 is a view illustrating a configuration example of a radio communication system according to an embodiment.

FIG. 9 is a view illustrating a configuration example of the radio communication system according to the embodiment. As illustrated in FIG. 9, the radio communication system according to this embodiment includes a base station eNB, a user equipment UE1, and a user equipment UE2. In FIG. 9, the user equipment UE1 is intended as a transmission side, and the user equipment UE2 is intended as a reception side. However, both of the user equipment UE1 and the user equipment UE2 include a transmission function and a reception function. Hereinafter, when not being particularly discriminated, the user equipment UE1 and the user equipment UE2 are simply described as "user equipment UE".

Each of the user equipment UE1 and the user equipment UE2 in FIG. 9 has a cellular communication function as a user equipment UE in LTE, and a D2D function including signal transmission and reception with the above-described channel. Furthermore, the user equipment UE1 and the user equipment UE2 have a function of executing an operation that is described in this embodiment. Furthermore, with regard to the cellular communication function and the existing D2D function, only partial functions (in a range capable of executing the operation described in this embodiment) or the entirety of the functions may be provided.

In addition, the user equipment UE may be any device having the D2D function, and examples thereof include a vehicle, a terminal of a pedestrian, an RSU (a UE type RSU having a UE function), and the like.

In addition, the base station eNB has the cellular communication function as the base station eNB in LTE, a function (setting information notification function and the like) capable of realizing a communication of the user equipment UE in this embodiment. In addition, the base station eNB includes an RSU (eNB type RSU having an eNB function).

In the following description, for example, "sensing" is performed by a method of using a measurement result of reception power (may be referred to as reception energy or reception intensity), a method of using a decoding result of D2D control information (that i, a method in which the D2D control information transmitted from another user equipment UE is received and is decoded to sense a resource position that is reserved by the other user equipment UE), a combination of these methods, and the like. In addition, the "resource" includes a time resource (for example, a subframe), or a time and frequency resource unless otherwise stated. In addition, description will be given on the assumption that the "D2D signal" may be a signal of the D2D communication (which may be D2D control information, data, or a combination of the D2D control information and the data), but the "D2D" signal may be a message (discovery signal) of the D2D discovery without limitation thereto.

The user equipment UE according to this embodiment selects a resource, with which the D2D signal is transmitted, by using the following sensing-based resource selection mode, and transmits the D2D signal with the resource that is selected at a transmission interval that is desired by the user equipment UE. Note that, the user equipment UE may include reservation information indicating that a resource for transmission of a D2D signal after the subsequent transmission interval is reserved in D2D control information transmitted with the resource that is selected so as to allow another user equipment UE to grasp the resource which is reserved by the user equipment UE.

<With Respect to Resource Selection Mode that is Studied in 3GPP>

Here, description will be given of a resource selection mode that is suggested in current 3GPP. The resource selection mode that is suggested in 3GPP is realized by the following sequence of three steps to be described below.

STEP 1: The entirety of resources (for example, a D2D resource pool), with which the D2D signal can be transmitted, are regarded as capable of being used (not being reserved).

STEP 2: Among the resources which are regarded as capable of being used in STEP 1, a reserved resource, which is grasped by decoding D2D control information transmitted from another user equipment UE, is excluded. Alternatively, among the resources which are regarded as capable of being used in STEP 1, a reserved resource, which is grasped by decoding D2D control information transmitted from another user equipment UE and satisfies a predetermined condition, is excluded. Examples of the predetermined condition include a case where power of demodulation reference signal (DM-RS) that is mapped to a data resource (for example, a resource of a PSSCH) indicated by the D2D control information is equal to or greater than a predetermined threshold value, or a case where power, which is estimated by a result obtained through measurement of a resource of the D2D control information, of data resource indicated by the D2D control information is equal to or greater than a predetermined threshold value, and the like.

STEP 3: Reception power of the entirety (or a part that is determined in advance (for example, resources with which a PSSCH can be transmitted, the same shall apply hereinafter) of resources (for example, a D2D resource pool) in which the D2D signal can be transmitted is measured, a partial resource (for example, a resource of which reception power is equal to or greater than a predetermined threshold value) based on a measurement result is further excluded from the remaining resources after the exclusion in STEP 2 to select a subset of resources which become the final resource selection candidate. That is, in the subset of the resources which become the final resource selection candidate, a resource, which is not an object to be excluded in STEP 2 and is not an object to be excluded in STEP 3, remains. Subsequently, the user equipment UE randomly selects one resource that is actually used in data transmission among the subset of the resources which become the final resource selection candidate.

Note that, it may be considered that in STEP 3, the one resource that is used in data transmission is directly selected from the resources which are not excluded in STEP 2. However, it is also assumed that the user equipment UE fails in decoding of the D2D control signal, and thus it is suggested that resource exclusion is also performed in STEP 3 in addition to STEP 2.

Note that, in current studies, it is only suggested that the user equipment UE randomly selects one resource that is actually used in data transmission from the resource subset in STEP 3. That is, as described above, in the sensing-based resource selection mode that is proposed in current 3GPP, a transmission interval of the D2D signal that is transmitted is not considered. Here, in this embodiment, a partial procedure is changed on the basis of the procedure of STEP 1 to STEP 3 to realize resource selection in consideration of the transmission interval of the D2D signal that is transmitted from the user equipment UE.

<With Regard to Resource Selection Mode According to Embodiment>

Next, description will be given of a sensing-based resource selection mode that is performed by the user equipment UE according to this embodiment.

(With Respect to Overview of Sensing-Based Resource Selection Mode)

First, description will be given of an overview of the sensing-based resource selection mode. The user equipment UE according to this embodiment has a function of executing the sensing-based resource selection mode.

Figure 10:
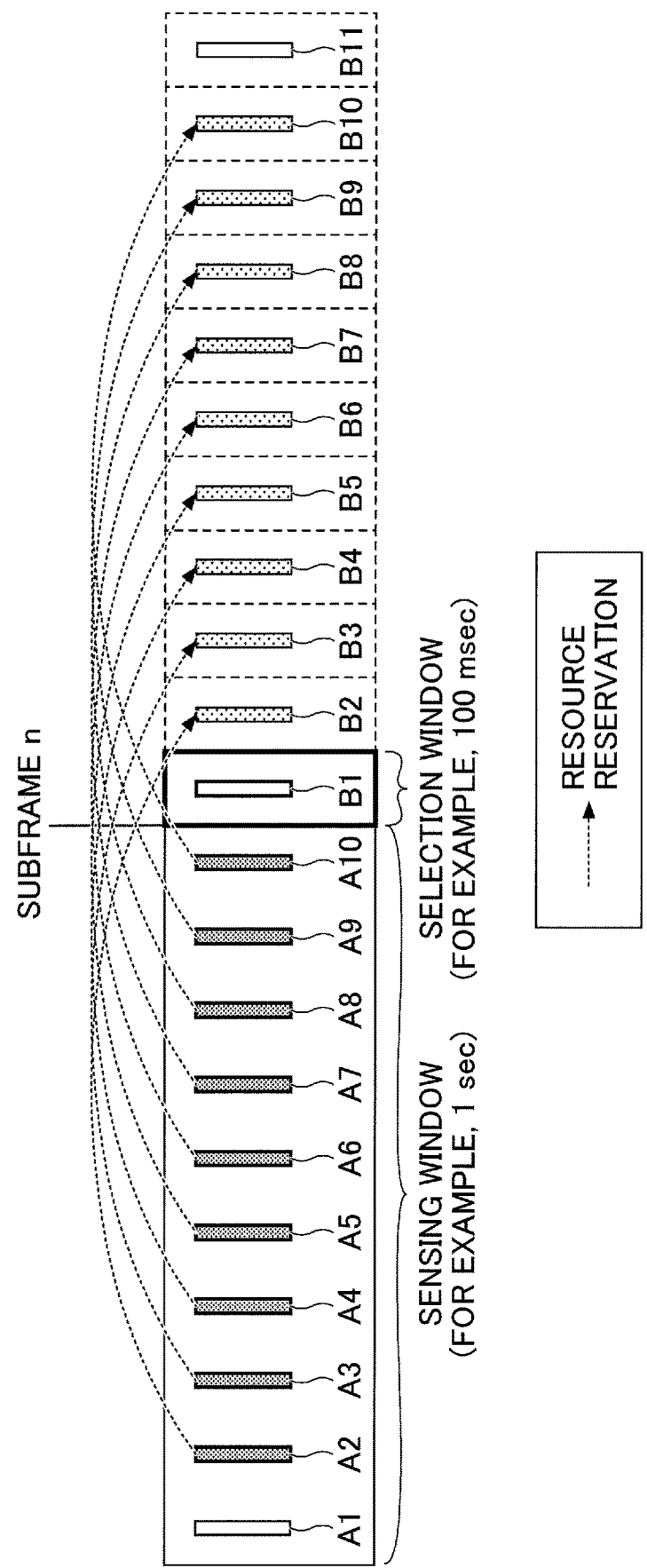
FIG. 10 is a view illustrating a sensing-based resource selection mode.

In FIG. 10, a subframe n represents a current subframe. "Sensing window" is a time window that is determined in advance in order for the user equipment UE to perform sensing. The user equipment UE performs sensing in a sensing window period to grasp a resource reservation situation in the future. For example, from a result obtained through sensing in the sensing window, the user equipment UE assumes that D2D control signals transmitted with resources A2 to A10 illustrated in FIG. 10 is detected. In a case where reservation information indicating reservation of resources B2 to B10 is included in each of the D2D control signals transmitted with the resources A2 to A10, the user equipment UE can grasp a situation in which the resources B2 to B10 among future resources are reserved already. Note that, a correspondence relationship between the resources in the sensing window and the future resources are explicitly expressed by the reservation information that is included in the D2D control signal, or implicitly expressed on the basis of notification information (broadcast information), RRC signaling, or a correspondence relationship (for example, regarding that a resource after 1000 ms is reserved, and the like) that is determined in advance in a semi-static manner with standard specifications and the like.

Note that, basically, a length of the sensing window is set to be equal to or longer than the maximum period in which each user equipment that performs a communication in this radio communication system can reserve a resource of the D2D signal. For example, in a case where the maximum period in which the user equipment UE can reserve the resource of the D2D signal is 1000 ms, the length of the sensing period is 1000 ms or longer. The reason for this is as follows. If the length of the sensing period is shorter than the maximum period in which the user equipment can reserve the resource of the D2D signal, it is difficult for the user equipment UE, which performs sensing, to appropriately grasp a resource that is reserved by another user equipment UE.

"Selection window" is a time window that is determined in advance as a period in which the user equipment UE selects a resource among future resources determined as resources which are not reserved from the sensing result. The user equipment UE performs sensing to grasp a reservation situation of the future resources, and selects a resource to be used for data transmission from resources which are included in the selection window among the grasped resources which are not reserved.

By providing the "selection window", the user equipment UE operates to select a resource only in a range of the "selection window" among the resources which are not reserved, and thus latency during data transmission is shortened. For example, in a case where the "selection window" is set to 100 ms, the user equipment UE selects a resource that is not reserved within 100 ms. In a case where the "selection window" is not provided, the user equipment UE selects an arbitrary resource among resources which are not reserved, and thus data transmission may be delayed.

Initiation timing and termination timing of the sensing window and the selection window may slide in conformity to the passage of time. For example, the initiation timing of the sensing window may be a subframe predetermined subframes before a current subframe, and the termination timing may be the current subframe. In addition, the initiation timing of the selection window may be the current subframe, and the termination timing may be a subframe predetermine subframes after the current subframe. In addition, the initiation timing and the termination timing of the sensing window and the selection window may be boundary timing of a periodic period (for example, a sidelink control (SC) period) that is configured in advance.

(With Respect to Resource Selection Mode According to Embodiment)

Next, description will be given of the sensing-based resource selection mode in which the user equipment UE according to this embodiment performs sensing. The user equipment UE according to this embodiment performs resource selection in consideration of a transmission interval of the D2D signal that is transmitted from the user equipment UE by changing a partial procedure among procedures of STEP 1 to STEP 3 which are described in the column of "<With Respect to Resource Selection Mode That is studied in 3GPP>".

[Resource Selection Mode (Mode 1-1)]

In a resource selection mode (mode 1-1), in STEP 3, when performing measurement of reception power with a resource with which the D2D signal can be transmitted, the user equipment UE performs measurement of the reception power in consideration of a desired transmission interval of the D2D signal. More specifically, the user equipment UE performs the resource selection in the following procedure. Note that, a configuration that is not particularly stated may be the same as in the respective STEPs described in the column of <With Respect to Resource Selection Mode That is studied in 3GPP>.

STEP 1: Future resources (for example, a future D2D resource pool), with which the D2D signal can be transmitted, are regarded as capable of being used (not being reserved).

STEP 2: Among the resources regarded as capable of being used in STEP 1, a resource, which is grasped as a reserved resource through decoding of D2D control information received in the sensing window, is excluded. Alternatively, among the resources regarded as capable of being used in STEP 1, a resource, which is grasped as a reserved resource through decoding of the D2D control information transmitted from another user equipment UE and satisfies a predetermined condition, is excluded. For example, in the example in FIG. 10, among future resources, the resources B1 to B10 are excluded.

STEP 3: Reception power of the entirety of resources (or partial resources which are determined in advance) in the sensing window is measured, and the subset of the resources which become the final resource selection candidate is selected by further excluding future resources, which are grasped as resources having a correspondence relationship with partial resources on the basis of the measurement result, from the remaining resources after exclusion in STEP 2. Next, the user equipment UE randomly selects one resource, which is actually used in data transmission, from resources which exist in the selection window in the subset of the resources which become the final resource selection candidate.

In STEP 3, the user equipment UE detects a resource (unoccupied resource), which can be selected in the selection window, from the subset of the resources which become the final resource selection candidate, and further excludes the unoccupied resource from the subset of the resources which become the final resource selection candidate in a case where a measurement result of reception power of a resource one transmission interval before the unoccupied resource in a past time direction satisfies a predetermined condition. For example, the predetermined condition represents a case where the measurement result of the reception power is equal to or greater than a predetermined threshold value. If a plurality of resources (unoccupied resources), which can be selected in the selection window, exist, the same processing is performed with respect to the plurality of unoccupied resources.

Figure 11:
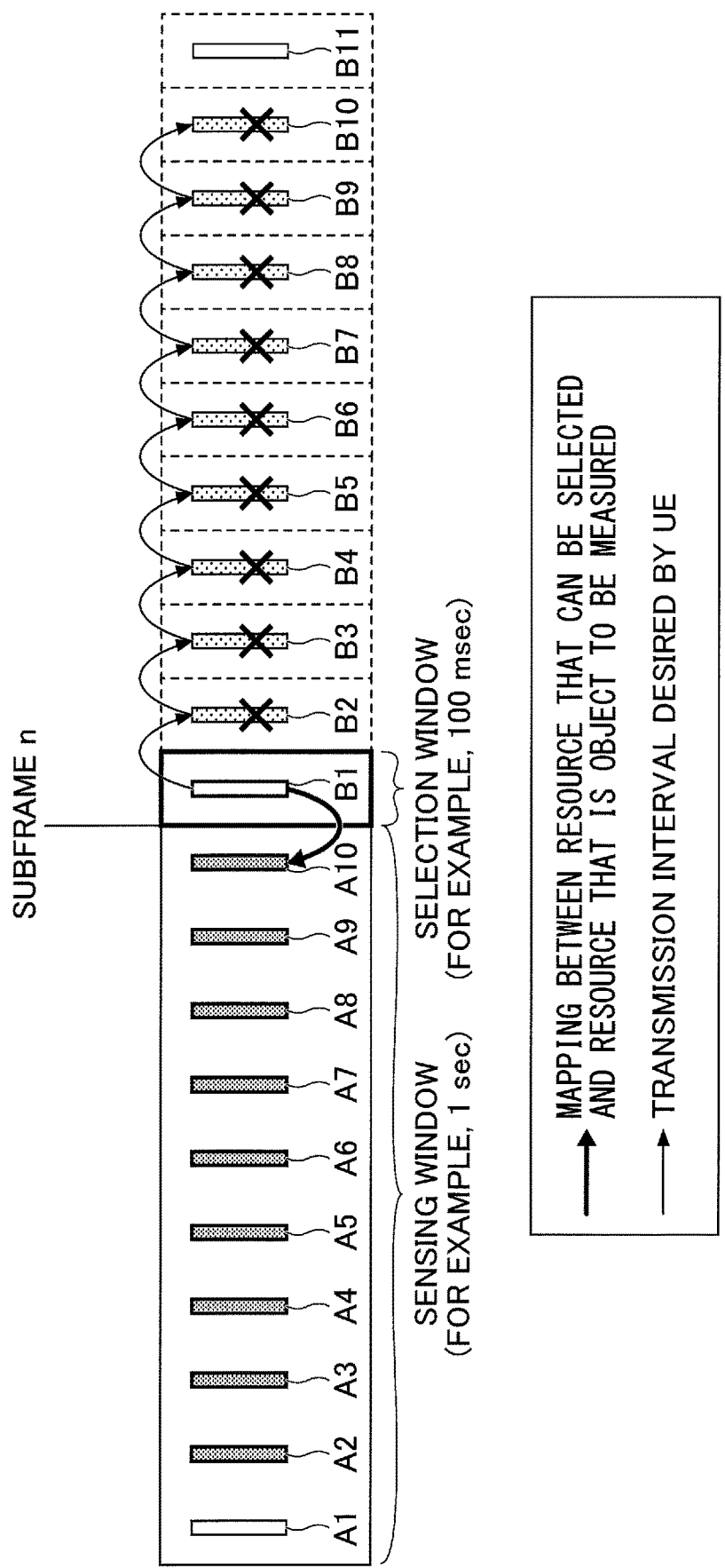
FIG. 11 is a view illustrating a specific example of the resource selection mode (Mode 1-1 thereof)
Figure 12:
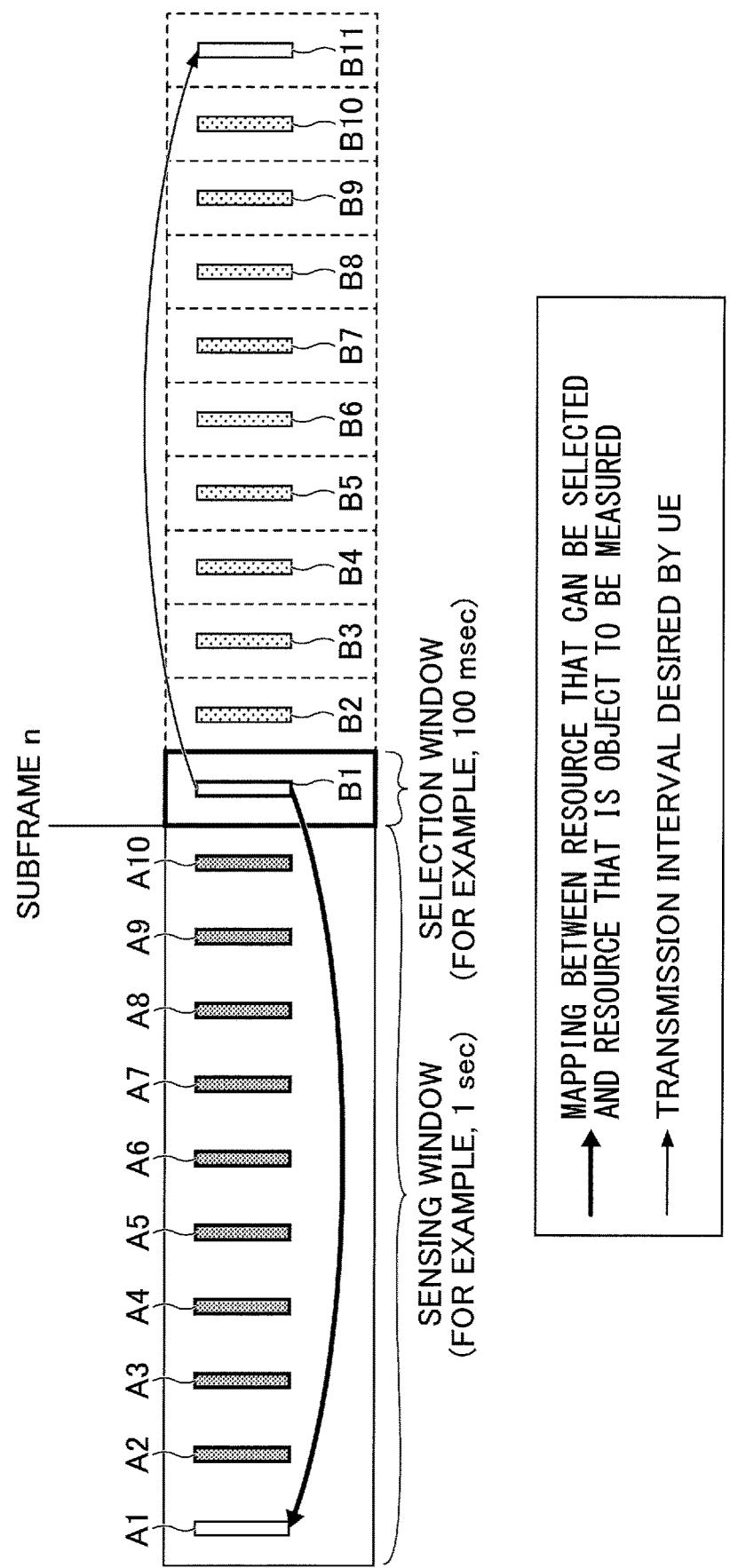
FIG. 12 is a view illustrating a specific example of the resource selection mode (Mode 1-1 thereof)

A specific example will be described with reference to FIG. 11 and FIG. 12. In FIG. 11 and FIG. 12, resources A2 to A10 are resources with which a D2D signal is transmitted from another user equipment UE. In addition, it is assumed that resources B2 to B10 having a correspondence relationship with the resources A2 to A10 are reserved. FIG. 11 illustrates a case where a transmission interval, which is desired by the user equipment UE, of the D2D signal is 100 ms, and FIG. 12 illustrates a case where the transmission interval, which is desired by the user equipment UE, of the D2D signal is 1000 ms.

For example, in FIG. 11, the user equipment UE detects a resource B1 as a resource (unoccupied resource) that can be selected in the selection window. Continuously, the user equipment UE determines whether or not a measurement result of reception power of the resource A10 that is one transmission interval before (that is, 100 ms before) the resource B1 is equal to or greater than a predetermined threshold value. In the example in FIG. 11, in the resource A10, the D2D signal is transmitted from another user equipment UE. Accordingly, in a case where a distance from the other user equipment UE is short, large reception power to a certain extent is measured. In a case where the measurement result of the reception power of the resource A10 is equal to or greater than a predetermined threshold value, the user equipment UE excludes the resource B1 from the subset of the resources which become the final resource selection candidate. In this case, the resource B1 is not included in the subset of the resources which become the final resource selection candidate, and thus the user equipment UE selects a resource other than the resource B1 as a resource that is actually used in data transmission.

Similarly, in FIG. 12, the user equipment UE detects the resource B1 as a resource (unoccupied resource) that can be selected in the selection window. Continuously, the user equipment UE determines whether or not a measurement result of reception power of a resource A1 one transmission interval before (that is, 1000 ms before) the resource B1 is equal to or greater than a predetermined threshold value. In the example in FIG. 12, it is assumed that in the resource A1, the D2D signal is not transmitted from another user equipment UE, and thus reception power is low (for example, only noise power, and the like). Accordingly, in the example of FIG. 12, the user equipment UE does not exclude the resource B1 from the subset of the resources which become the final resource selection candidate. In this case, the resource B1 is also included in the subset of the resources which become the final resource selection candidate, and thus the resource B1 can be selected as a resource that is actually used in data transmission.

[Resource Selection Mode (Mode 1-2)]

Even in a resource selection mode (mode 1-2), in STEP 3, measurement of reception power is performed in consideration of the transmission interval, which is desired by the user equipment UE, of the D2D signal when performing measurement of the reception power with a resource with which the D2D signal can be transmitted. A configuration that is not particularly stated is the same as in the resource selection mode (mode 1-1). STEP 1 and STEP 2 are the same as in the resource selection mode (mode 1-1), and thus description thereof will be omitted.

STEP 3: Reception power of the entirety of resources (or partial resources which are determined in advance) in the sensing window is measured, and future resources, which are grasped as resources having a correspondence relationship with partial resources on the basis of the measurement result, are further excluded from the remaining resources after exclusion in STEP 2. According to this, a subset of resources which become a final resource selection candidate is selected. Continuously, the user equipment UE randomly selects one resource, which is actually used in data transmission, from resources which exist in the selection window in the subset of the resources which become the final resource selection candidate.

In STEP 3, the user equipment UE detects a resource (unoccupied resource), which can be selected in the selection window, from the subset of the resources which become the final resource selection candidate, and in a case where a measurement result of reception power for a plurality of resources, which are repeated in a transmission interval in a past time direction with the unoccupied resource set as a starting point, satisfies a predetermined condition, the unoccupied resource is further excluded from the subset of the resources which become the final resource selection candidate. Here, for example, the plurality of resources, which become an object to be measured, are resources at the same frequency position determined in a specific time period going back from a resource (the unoccupied resource) that is the resource selection candidate, and resources in the sensing window. The specific time period is a single period or a plurality of periods, and may be determined in advance, may be preconfigured, or may be notified by notification information (broadcast information) or higher layer signaling from the base station eNB. The specific time period may be a transmission period (reservation interval) of the user equipment UE that performs resource selection. For example, the predetermined condition is a case where an average value of reception power for a plurality of resources which are repeated in a transmission interval with the unoccupied resource set as a starting point is equal to or greater than a predetermined threshold value. The predetermined condition may correspond to a case where the maximum value or the minimum value is equal to or greater than a predetermined threshold value without limitation to the above-described case. In a case where a plurality of resources (or unoccupied resources), which can be selected in the selection window, exist, the same processing is performed with the plurality of unoccupied resources.

Figure 13:
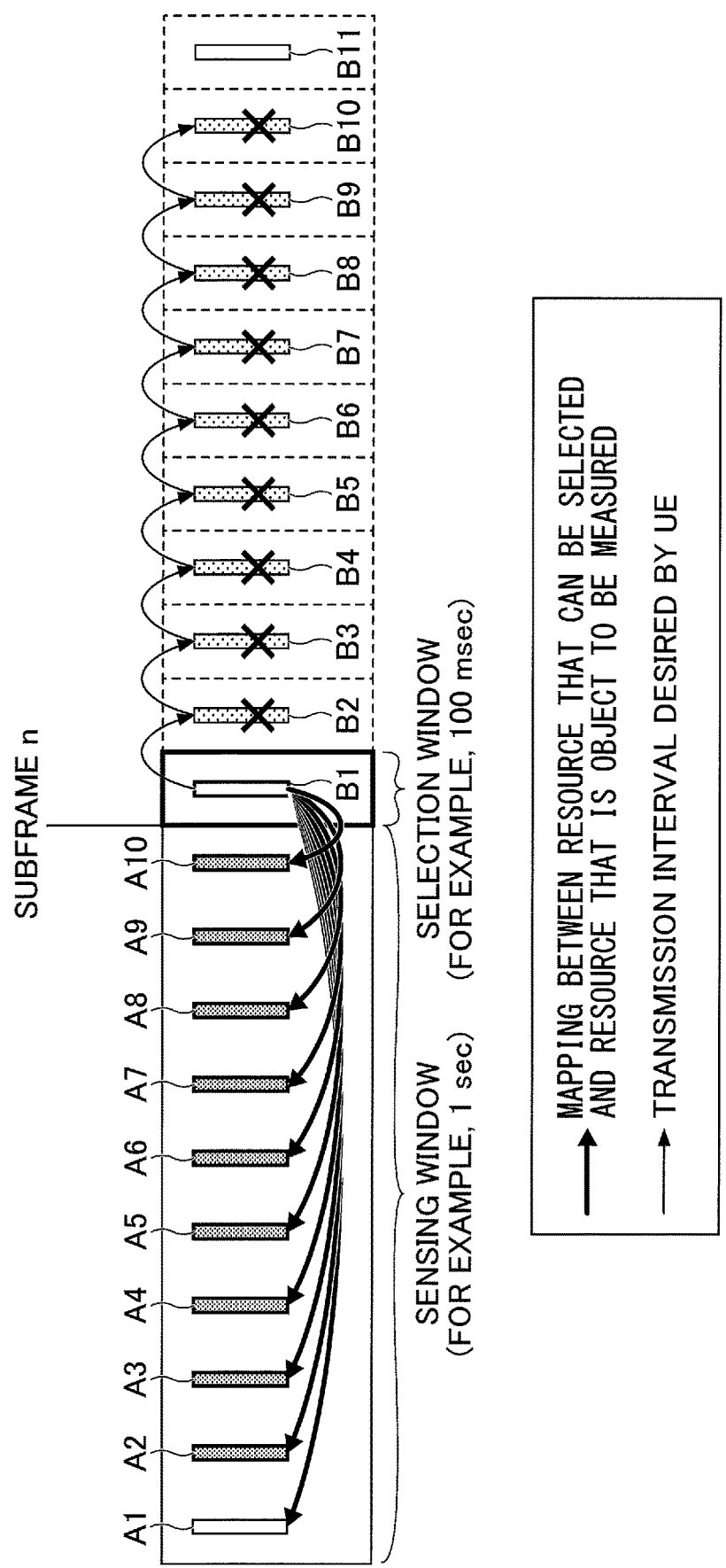
FIG. 13 is a view illustrating a specific example of the resource selection mode (Mode 1-2 thereof)
Figure 14:
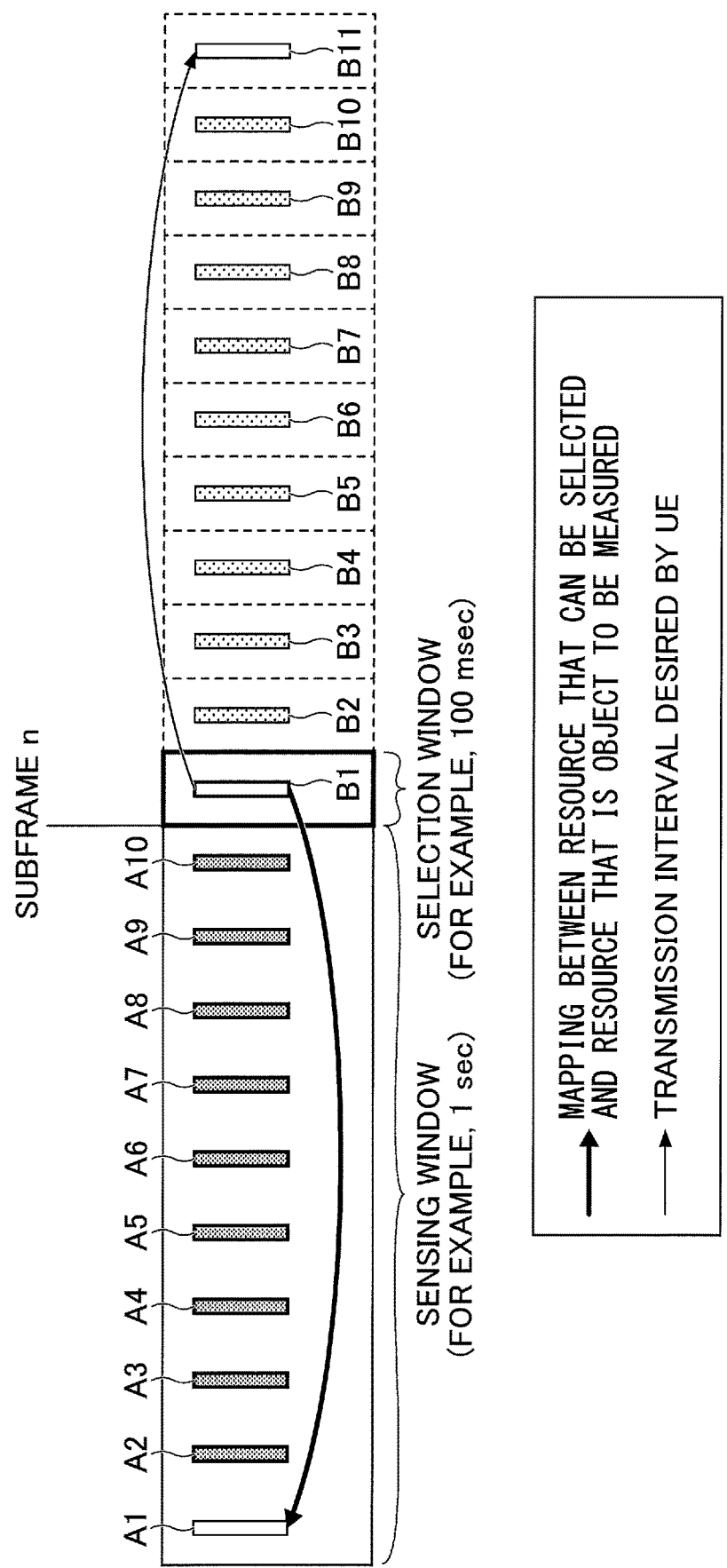
FIG. 14 is a view illustrating a specific example of the resource selection mode (Mode 1-2 thereof)

A specific example will be described with reference to FIG. 13 and FIG. 14. In FIG. 13 and FIG. 14, resources A2 to A10 are resources with which a D2D signal is transmitted from another user equipment UE. In addition, it is assumed that resources B2 to B10 having a correspondence relationship with the resources A2 to A10 are reserved. FIG. 13 illustrates a case where a transmission interval, which is desired by the user equipment UE, of the D2D signal is 100 ms, and FIG. 14 illustrates a case where the transmission interval, which is desired by the user equipment UE, of the D2D signal is 1000 ms. In addition, the predetermined condition is assumed as a case where an average value of reception power for a plurality of resources is equal to or greater than a predetermined threshold value.

For example, in FIG. 13, the user equipment UE detects a resource B1 as a resource (unoccupied resource) that can be selected in the selection window. Next, the user equipment UE determines whether or not an average value of measurement results of reception power of the plurality of resources A1 to A10 which are repeated in a transmission interval with the resource B1 set as a starting point is equal to or greater than a predetermined threshold value. In the example of FIG. 13, it is assumed that the D2D signal is transmitted from another user equipment UE in the resources A2 to A10, and thus the average value of the reception power is large to a certain extent. In a case where the average value of the reception power of the resources A1 to A10 is equal to or greater than a predetermined threshold value, the user equipment UE excludes the resource B1 from the subset of the resources which become the final resource selection candidate.

Similarly, in FIG. 14, the user equipment UE detects the resource B1 as a resource (unoccupied resource) that can be selected in the selection window. Next, the user equipment UE determines whether or not the average value of the measurement values of the reception power of the plurality of resources which are repeated in a transmission interval with the resource B1 set as a starting point is equal to or greater than a predetermined threshold value. In the example in FIG. 14, the transmission interval is 1000 ms, and thus only the resource A1 becomes an object to be determined. In the example of FIG. 14, it is assumed that the D2D signal is not transmitted from another user equipment UE at the resource A1, and thus the reception power is low (for example, only noise power, and the like). Accordingly, in the example of FIG. 14, the user equipment UE does not exclude the resource B1 from the subset of the resources which become the final resource selection candidate. In this case, the resource B1 is also included in the subset of the resources which become the final resource selection candidate, and thus the resource B1 can be selected as a resource that is actually used in data transmission.

Note that, in the resource selection mode (mode 1-1) and the resource selection mode (mode 1-2), the transmission interval (resource reservation period), which can be selected by the user equipment UE, may be limited. For example, the transmission interval may be limited to a period combination in which a relatively great reservation period can be divided into small reservation periods such as 100 ms, 200 ms, and 1000 ms.

For example, it is assumed that the user equipment UE is scheduled to transmit data with a resource X 200 ms after a resource which can be selected in the selection window. In a case where another user equipment UE, which is scheduled to transmit a signal in a period of 500 ms, is scheduled to transmit data with the resource X, the other user equipment UE has transmitted a D2D signal with a resource Y 500 ms before the resource X. However, for example, in the resource selection mode (mode 1-2), one or a plurality of resources, of which reception power is measured in STEP 3 by the user equipment UE, are resources in an interval of 200 ms, such as a resource 400 ms before the resource X, a resource 600 ms before the resource X, a resource 800 ms before the resource X, which does not include the resource Y. That is, measurement omission occurs. Here, when the transmission interval (resource reservation period), which can be selected by the user equipment UE, is limited as described above, it is possible to avoid occurrence of the measurement omission.

Hereinbefore, the resource selection mode (mode 1-1) and the resource selection mode (1-2) have been described. As illustrated in FIG. 11 and FIG. 13, the resources B2 to B10 are reserved. That is, in a case where the transmission interval, which is desired by the user equipment UE, is 100 ms, if the user equipment UE performs data transmission by selecting the resource B1, collision does not occur in first data transmission, but in second or later data transmission (data transmission in the resources B2 to B10), collision occurs. However, according to the resource selection mode (mode 1-1) and the resource selection mode (mode 1-2), a resource, for which occurrence of collision is predicted in the second or later data transmission, is excluded from the subset of the resources which become the final resource selection candidate, and thus it is possible to suppress occurrence of collision. In addition, in the resource selection mode (mode 1-1) and the resource selection mode (mode 1-2), a reservation situation of future resources is determined by using the measurement result of the reception power of a resource in the sensing window in addition to decoding result of the D2D control information. According to this, it is possible to further suppress occurrence of the collision in comparison to a method of determining the reservation situation of the future resources by only the decoding result of the D2D control information.

In addition, in the resource selection mode (mode 1-2) which is different from the resource selection mode (1-1), in STEP 3, in a case where the measurement result of the reception power for the plurality of resources, which are repeated in a transmission interval from a resource (unoccupied resource) that can be selected in the selection window as a starting point, satisfies a predetermined condition, the unoccupied resource is excluded from the subset of the resources which become the final resource selection candidate. In a case where the D2D signal is not transmitted from another user equipment UE with the resource A10 in FIG. 11, in the resource selection mode (mode 1-1), the resource B1 is not excluded from the subset of the resources which become the final resource selection candidate. On the other hand, in the resource selection mode (mode 1-2), even in a case where the D2D signal is not transmitted from other user equipment UE with the resource A10, a measurement result of reception power of resources (resources A2 to A9) other than the resource A10 is also considered, and thus the resource B1 can be excluded from the subset of the resources which become the final resource selection candidate. That is, the resource selection mode (mode 1-2) can further suppress occurrence of collision in comparison to the resource selection mode (mode 1-1).

[Resource Selection Mode (Mode 2)]

In a resource selection mode (mode 2), a new procedure is added between STEP 2 and STEP 3. According to this, a resource, which cannot perform data transmission in a transmission interval desired by the user equipment UE, is excluded from the subset of the resources which become the final resource selection candidate in STEP 3. As a result, it is possible to suppress occurrence of collision.

Figure 15:
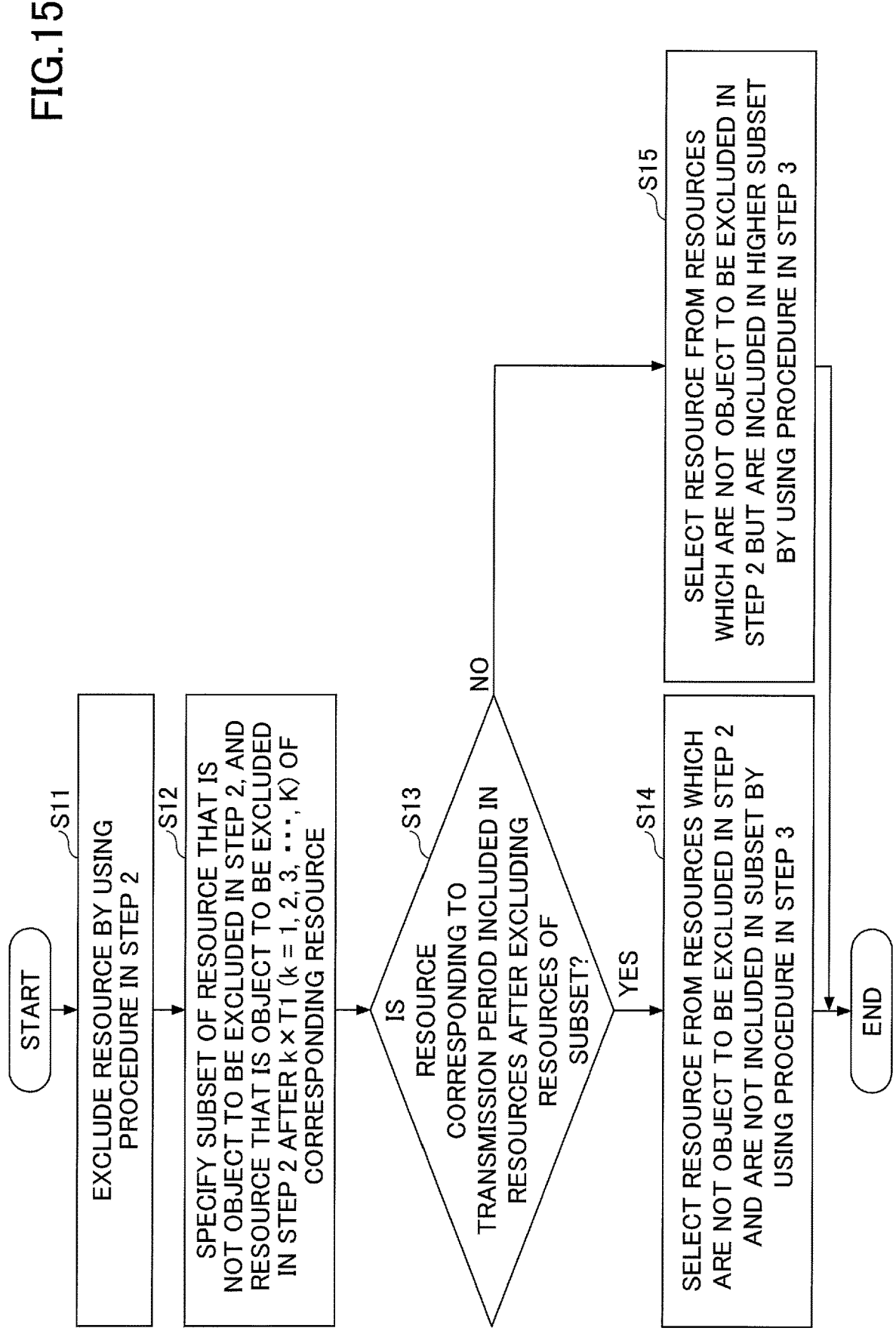
FIG. 15 is a flowchart illustrating the resource selection mode (Mode 2 thereof)

FIG. 15 is a flowchart illustrating the resource selection mode (mode 2). In FIG. 15, "T1" represents a transmission interval desired by the user equipment UE. "k" represents a positive integral from 1 to K. "K" is a positive integral. "K" may be fixedly determined in advance with standard specifications and the like, may be preset (preconfigured) in the user equipment UE by SIM and the like, or may be configured in the user equipment UE through a base station eNB or a core network.

Figure 16:
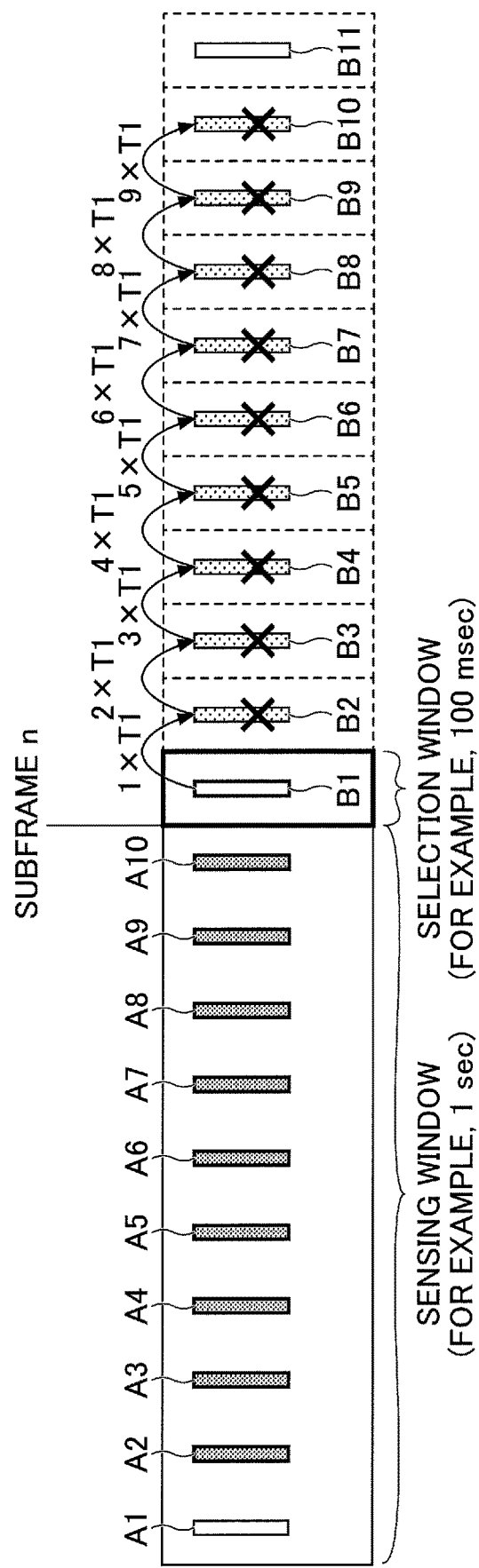
FIG. 16 is a view illustrating a specific example of the resource selection mode (Mode 2 thereof)
Figure 17:
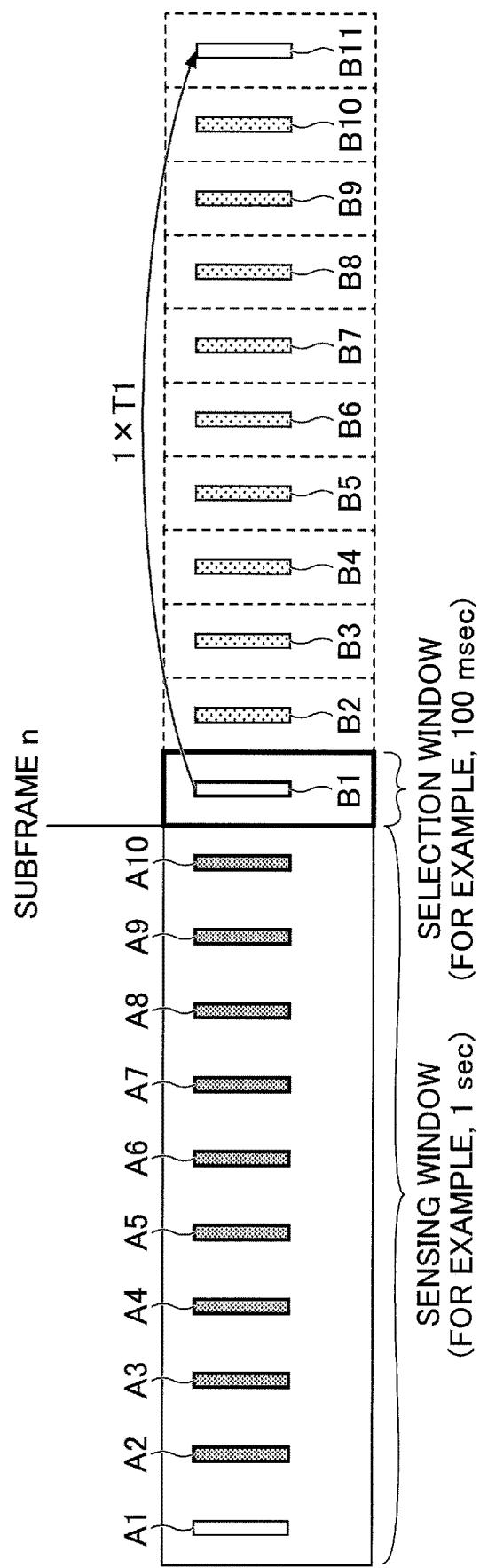
FIG. 17 is a view illustrating a specific example of the resource selection mode (Mode 2 thereof)

First, the user equipment UE, which has performed the procedure of STEP 1, excludes a resource by using the procedure of STEP 2 (S11). The procedure of STEP 1 and STEP 2 is the same as in the resource selection mode (mode 1-1), and thus description thereof will be omitted. Continuously, the user equipment UE specifies a subset (for convenience, referred to as "second subset" for discrimination from the subset that is used in STEP 3) of a resource that exists in the selection window among resources which are not objects to be excluded in STEP 2, and a plurality of resources k×T1 after the resource as a starting point and determined as an object to be excluded in STEP 2 (S12), A procedure of step S12 will be described in detail with reference to FIG. 16 and FIG. 17. In FIG. 16 and FIG. 17, resource A2 to A10 are resources with which a D2D signal is transmitted from another user equipment UE. In addition, resources B2 to B10 having a correspondence relationship with the resources A2 to A10 are reserved resources, and are resources determined as being excluded in STEP 2. In addition, in FIG. 16, T1 is set to 100 ms and K is set to 9. In FIG. 17, T1 set to 1000 ms and K is set to 1. In a case of FIG. 16, a resource B1 in the selection window, and the resource B2 to the resource B10 after the resource B1 by 100 ms (1×T1) to 900 ms (9×T1) are specified as the second subset. On the other hand, in a case of FIG. 17, the second subset is not specified.

That is, the resources which are included in the second subset may also be referred to as resources which are not suitable as a resource that is actually used in data transmission by the user equipment UE.

Next, the user equipment UE determines whether or not a plurality of resources (that is, unoccupied resources which are not reserved), which can be subjected to repetitive data transmission in a transmission period (T1) desired by the user equipment UE, are included in resources after further excluding the resources of the second subset from the remaining resources after exclusion in step S11 (S13). For example, the user equipment UE may determine that among resources after further excluding the resources of the second subset from the remaining resources after exclusion in step S11, a resource, which can be used in first data transmission, is included in the selection window, and a plurality of resources k×T1 after the resource are resources which are not reserved. In the example of FIG. 16, if K is 9, the user equipment UE determines whether or not all resources from B1 to B10 are unoccupied. In addition, if K is 2, the user equipment UE determines whether or not all resources from B1 to B3 are unoccupied. In a case of YES in step S13, it proceeds to step S14, and in a case of NO in step S13, it proceeds to step S15.

Next, with regard to the resources which are not objects to be excluded in STEP 2, and are not included in the second subset, the user equipment UE performs resource selection by using the procedure of STEP 3 (S14). In other words, step S14 may be defined to perform the following procedure of STEP 3.

STEP 3: Reception power of the entirety of resources (or partial resources which are determined in advance) in the sensing window is measured, and the subset of the resources which become the final resource selection candidate is selected by further excluding future resources, which are grasped as resources having a correspondence relationship with partial resources on the basis of the measurement result, and the resources of the second subset from the remaining resources after exclusion in STEP 2. Next, the user equipment UE randomly selects one resource, which is actually used in data transmission, from resources which exist in the selection window in the subset of the resources which become the final resource selection candidate.

Note that, in step 14, the user equipment UE may randomly select one resource, which is actually used in data transmission, directly from resources which are not objects to be excluded in STEP 2, are not included in the second subset, and exist in the selection window (that is, the user equipment UE may not perform the resource exclusion that is performed in STEP 3 on the basis of the measurement result of the reception power). According to this, it is possible to select a resource that is used in data transmission from more resources in the selection window.

Next, the user equipment UE selects a resource by using the procedure of STEP 3 from resources which are not objects to be excluded in STEP 2 but are included in the second subset (S15). In other words, step S15 may be defined to perform the following procedure of STEP 3.

STEP 3: Reception power of the entirety of resources (or partial resources which are determined in advance) in the sensing window is measured, and the subset of the resources which become the final resource selection candidate is selected by further excluding future resources, which are grasped as resources having a correspondence relationship with partial resources on the basis of the measurement result, from the remaining resources after exclusion in STEP 2. Continuously, the user equipment UE randomly selects one resource, which is actually used in data transmission, from resources which exist in the selection window in the subset of the resources which become the final resource selection candidate. Note that, the user equipment UE may execute the procedure of STEP 3 in the resource selection mode (mode 1-1) or the resource selection mode (mode 1-2) instead of STEP 3 in step S15.

Hereinbefore, the resource selection mode (mode 2) has been described. In a case where a plurality of resources, with which repetitive data transmission can be performed in a transmission period (T1) desired by the user equipment UE, exist (that is, are not reserved), it proceeds to step S14. In addition, in step S14, the user equipment UE does not select the resources (resources which are not suitable as described above), which are included in the second subset, as a resource that is actually used in data transmission. That is, one resource, which is actually used in data transmission by the user equipment UE, is a resource with which data transmission is possible also in the subsequent transmission period, and thus it is possible suppress occurrence of collision.

On the other hand, in a case where the plurality of resources, with which repetitive data transmission is possible in the transmission period (T1) desired by the user equipment UE, do not exist (that is, are reserved), it proceeds to step S15. In a case of step S15, there is a possibility that the user equipment UE may select the resources included in the second subset as a resource that is actually used in data transmission. That is, in the case of step S15, the resource, which is actually used in data transmission by the user equipment UE, is a resource in which possibility of occurrence of collision is high in the subsequent transmission period. Here, in step S15, the user equipment UE may give up (stop) data transmission without selecting one resource that is actually used in data transmission. According to this, it is possible to suppress occurrence of collision.

In addition, the user equipment UE may execute the procedure in FIG. 15 again after passage of predetermined time. According to this, in a case where a resource congestion is resolved, data transmission becomes possible.

In addition, in a case of transitioning to step S15, since the user equipment UE regards future transmission resources as being reserved already by another user equipment UE, resource reservation may not be performed. According to this, it is possible to avoid transmission of useless reservation signaling, and an improvement of space utilization efficiency of a resource, and an early resource reselection operation are expected.

<Functional Configuration>
(User Equipment)

Figure 18:
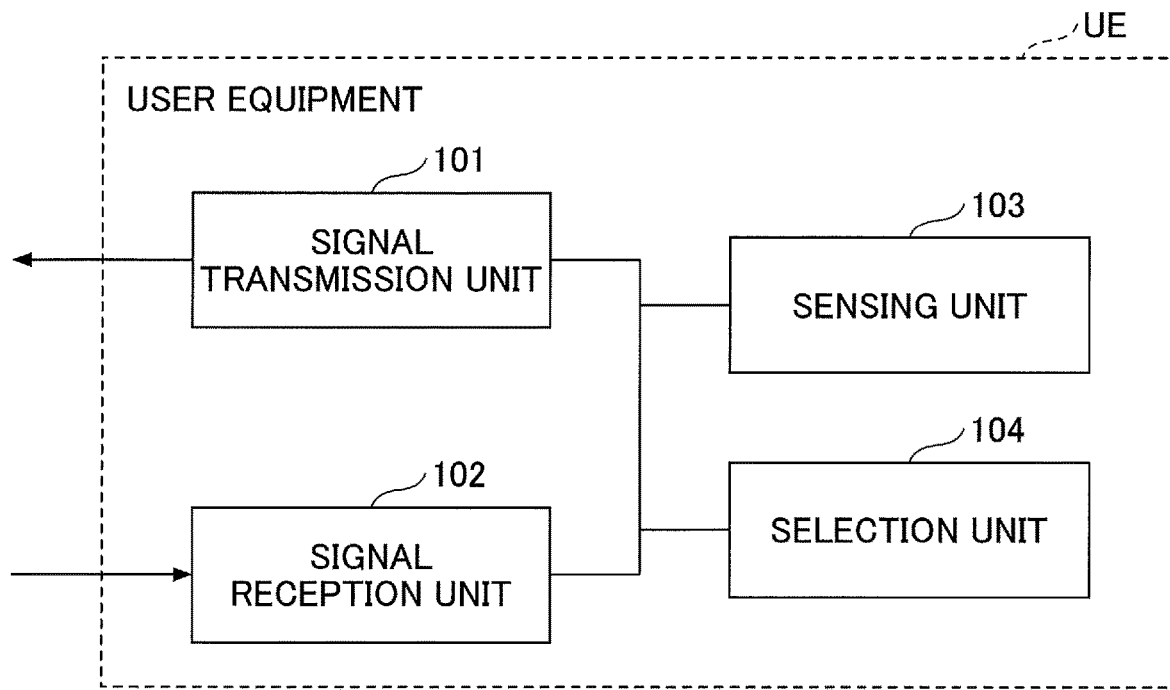
FIG. 18 is a view illustrating an example of a functional configuration of a user equipment according to the embodiment.

FIG. 18 is a view illustrating an example of the functional configuration of a user equipment according to an embodiment. As illustrated in FIG. 18, the user equipment UE includes a signal transmission unit 101, a signal reception unit 102, a sensing unit 103, and a selection unit 104. Furthermore, FIG. 18 illustrates only functional units which are particularly related to the embodiment of the invention in the user equipment UE, and functions (not illustrated) for executing at least operations based on LTE are also provided. In addition, the functional configuration illustrated in FIG. 18 is illustrative only. A functional classification or the name of the functional units may be arbitrarily set as long as the operation according to this embodiment can be executed. In addition, a part (only a partial resource selection sequence, a partial modification example, and the like) of the processing of the user equipment UE as described above may be executed.

The signal transmission unit 101 includes a function of creating various signals of a physical layer from a D2D signal to be transmitted to another user equipment UE or the base station eNB, and wirelessly transmitting the signals. In addition, the signal transmission unit 101 includes a transmission function of the D2D signal and a transmission function of a cellular communication. In addition, the signal transmission unit 101 includes a function of selecting a resource for transmission of the D2D signal among one or more resource candidates selected by the selection unit 104, and transmitting the D2D signal.

The signal reception unit 102 includes a function of wirelessly receiving various signals from another user equipment UE or the base station eNB, and acquiring a signal of a further higher layer from a signal of a physical layer which is received. In addition, the signal reception unit 102 includes a reception function of the D2D signal and a reception function of the cellular communication.

The sensing unit 103 performs sensing in the sensing window to grasp a reservation situation of future resources.

The selection unit 104 includes a function of selecting a resource candidate with which the D2D signal can be transmitted on the basis of the reservation situation, which is grasped by the sensing unit 103, of the future resource. In addition, the selection unit 104 includes a function of selecting one more resource candidates, with which a signal can be transmitted, in a selection window subsequent to the sensing window on the basis of a sensing result and a transmission interval of the D2D signal that is transmitted by the user equipment UE.

In addition, the selection unit 104 may detect an unoccupied resource in the selection window in accordance with the sensing result, and may select one or more resource candidates, with which the D2D signal can be transmitted, by excluding the unoccupied resource from the one or more resource candidates with which the D2D signal can be transmitted in a case where reception power of a resource one transmission interval before the unoccupied resource in a past time direction is equal to or greater than a predetermined threshold value.

In addition, the selection unit 104 may detect an unoccupied resource in the resource selection time window in accordance with the sensing result, and may select one or more resource candidates, with which the D2D signal can be transmitted, by excluding the unoccupied resource from one or more resource candidates, with which the D2D signal can be transmitted, in a case where reception power for a plurality of resources, which are repeated in a transmission interval from the unoccupied resource, as a starting point, in a past time direction, satisfies a predetermined condition. Note that, the case where the predetermined condition is satisfied may represent a case where a maximum value, an average value, or a minimum value of the reception power for the plurality of resources which are repeated in a transmission interval from the unoccupied resource as a starting point is equal to or greater than a predetermined threshold value.

In addition, the selection unit 104 may detect an unoccupied resource in the selection window in accordance with the sensing result, and may exclude the unoccupied resource from one or more resource candidates, with which the D2D signal can be transmitted, in a case where it is determined that a plurality of resources, which are repeated in a transmission interval from the unoccupied resource, as a starting point, in a future time direction, are reserved in accordance with the sensing result.

(Base Station)

Figure 19:
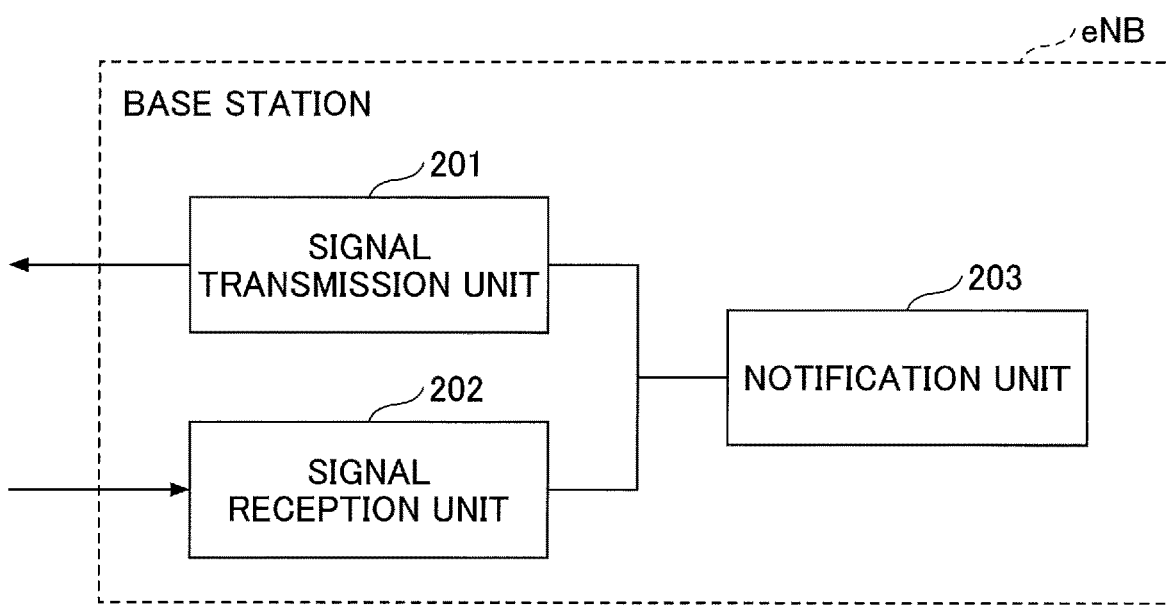
FIG. 19 is a view illustrating an example of a functional configuration of a base station according to the embodiment.

FIG. 19 is a view illustrating an example of a functional configuration of the base station according to this embodiment. As illustrated in FIG. 19, a base station eNB includes a signal transmission unit 201, a signal reception unit 202, and a notification unit 203. Furthermore, FIG. 19 illustrates only functional units which are particularly related to the embodiment of the invention in the base station eNB, and functions (not illustrated) for executing at least operations based on LTE are also provided. In addition, the functional configuration illustrated in FIG. 19 is illustrative only. A functional classification or the name of the functional units may be arbitrarily set as long as the operation according to this embodiment can be executed.

The signal transmission unit 201 includes a function of creating various signals of a physical layer from a signal of a higher layer to be transmitted from the base station eNB, and wirelessly transmitting the signals. The signal reception unit 202 includes a function of wirelessly receiving various signals from the user equipment UE, and acquiring a signal of a further higher layer from a signal of a physical layer which is received.

The notification unit 203 notifies the user equipment UE of various pieces of information, which are used by the user equipment UE to perform the operations according to this embodiment, by using broadcast information (SIB) or RRC signaling. Note that, examples of the various pieces of information include information indicating configuration of a D2D resource pool, information indicating a position of an SC period, information indicating start timing and end timing of various windows (the sensing window and the selection window), a value of "K", and the like.

<Hardware Configuration>

The block diagrams (FIG. 18 and FIG. 19) which are used in description of the embodiment illustrate blocks of a function unit. The function blocks (constituent units) are realized by an arbitrary combination of hardware and/or software. In addition, means for realizing respective function blocks is not particularly limited. That is, the respective function blocks may be realized by one device that is physically and/or logically combined. In addition, two or greater devices, which are physically and/or logically separated from each other, may be directly and/or indirectly (for example, wire and/or wirelessly) connected, and the respective function blocks may be realized by a plurality of the devices.

Figure 20:
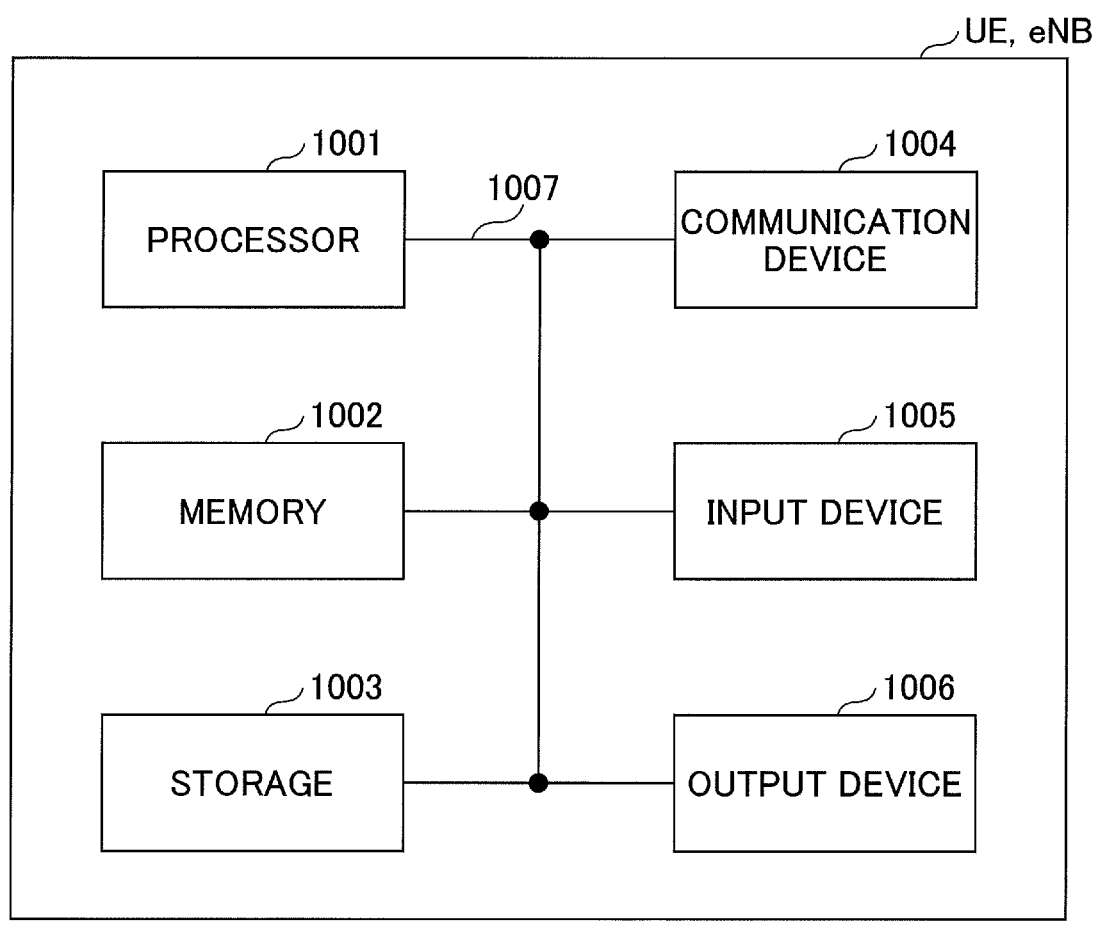
FIG. 20 is a view illustrating an example of a hardware configuration of the base station and the user equipment according to the embodiment.

For example, the base station eNB and the user equipment UE in the embodiment of the present invention may function as a computer that executes processing of the signal transmission method of the invention. FIG. 20 is a view illustrating an example of a hardware configuration of the base station eNB and the user equipment UE according to the embodiment. The base station eNB and the user equipment UE may be configured as a computer device that physically includes a processor 1001, a memory 1002, a storage 1003, a communication device 1004, an input device 1005, an output device 1006, a bus 1007, and the like.

Furthermore, in the following description, a term "device" may be substituted with a circuit, a device, a unit, and the like. The hardware configuration of the base station eNB and the user equipment UE may include the respective devices in the drawing one by one or in a plural number, or may not include a part of the devices.

Respective functions in the base station eNB and the user equipment UE are realized by reading out predetermined software (program) from hardware such as the processor 1001 and the memory 1002 so as to allow the processor 1001 to perform an arithmetic operation, and by controlling a communication by the communication device 1004, and reading-out and/or input of data in the memory 1002 and the storage 1003.

For example, the processor 1001 allows an operating system to operate so as to control the entirety of the computer. The processor 1001 may be constituted by a central processing unit (CPU) that includes an interface with a peripheral device, a control device, an arithmetic operation device, a register, and the like. For example, the signal transmission unit 201, the signal reception unit 202, and the notification unit 203 of the base station eNB, and the signal transmission unit 101, the signal reception unit 102, the sensing unit 103, and the selection unit 104 of the user equipment UE may be realized by the processor 1001.

In addition, the processor 1001 reads out a program (program code), a software module, or data from the storage 1003 and/or the communication device 1004 into the memory 1002, and performs various kinds of processing according to the program, the software module, or the data. As the program, a program, which allows the computer to execute at least a part of the operations described in the embodiment, is used. For example, the signal transmission unit 201, the signal reception unit 202, and the notification unit 203 of the base station eNB, and the signal transmission unit 101, the signal reception unit 102, the sensing unit 103, and the selection unit 104 of the user equipment UE may be realized by a control program that is stored in the memory 1002 and is operated by the processor 1001, and other functional blocks may be realized in the same manner. The above-described various kinds of processing are described to be executed by one processor 1001, but may be simultaneously or sequentially executed by two or greater processors 1001. The processor 1001 may be mounted by one or greater chips. Note that, the program may be transmitted from a network through electric communication line.

The memory 1002 is a computer-readable recording medium, and may be constituted by, for example, at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), and the like. The memory 1002 can retain a program (program code), a software module, and the like which can be executed to carry out the signal transmission method according to the embodiment of the invention.

The storage 1003 is a computer-readable recording medium, and may be constituted by at least one, for example, among an optical disc such as a compact disc ROM (CD-ROM), a hard disk drive, a flexible disk, a magneto-optical disc (for example, a compact disc, a digital multi-purpose disc, and a Blue-ray (registered trademark) disc), a smart card, a flash memory (for example, a card, a stick, a key drive), a floppy (registered trademark) disk, a magnetic strip, and the like. The storage 1003 may be referred to as an auxiliary storage device. For example, the above-described storage medium may be database including the memory 1002 and/or the storage 1003, a server, and other appropriate media.

The communication device 1004 is hardware (transmission and reception device) that performs a communication between computers through wire and/or radio network, and may be referred to as, for example, a network device, a network controller, a network card, a communication module, and the like. For example, the signal transmission unit 201 and the signal reception unit 202 of the base station eNB, and the signal transmission unit 101 and the signal reception unit 102 of the user equipment UE may be realized by the communication device 1004.

The input device 1005 is an input device (for example, a keyboard, a mouse, a microphone, a switch, a button, a sensor, and the like) that receives an input from the outside. The output device 1006 is an output device (for example, a display, a speaker, an LED lamp, and the like) that performs output to the outside. Furthermore, the input device 1005 and the output device 1006 may have an integral configuration (for example, a touch panel).

In addition, respective devices including the processor 1001, the memory 1002, and the like are connected to each other through a bus 1007 for an information communication. The bus 1007 may be configured as a single bus, or may be configured as a bus that is different between devices.

In addition, the base station eNB and the user equipment UE may include hardware such as a microprocessor, a digital signal processor (DSP), an application specific integrated circuit (ASIC), a programmable logic device (PLD), and a field programmable gate array (FPGA), or a part or the entirety of respective function blocks may be realized by the hardware. For example, the processor 1001 may be mounted by at least one piece of hardware.

<Summary>

As described above, according to the embodiment, there is provided a user equipment that selects a resource for signal transmission on the basis of a result of sensing that is performed in a sensing time window. The user equipment includes: a selection unit that selects one or more resource candidates with which a signal is capable of being transmitted in a resource selection time window subsequent to the sensing time window on the basis of the sensing result and a transmission interval of a signal that is transmitted by the user equipment; and a transmission unit that selects a resource for signal transmission from the one or more resource candidates which are selected and transmits the signal. According to the user equipment UE, in a mode of selecting a resource for signal transmission on the basis of a sensing result, it is possible to provide a technology capable of suppressing collision of signals.

In addition, the selection unit may detect an unoccupied resource in the resource selection time window in accordance with the sensing result, and may select the one or more resource candidates, with which a signal is capable of being transmitted, by excluding the unoccupied resource from the one or more resource candidates with which a signal is capable of being transmitted in a case where reception power of a resource, which is previous to the unoccupied resource by one transmission interval in a past time direction, is equal to or greater than a predetermined threshold value. According to this, a resource in which occurrence of collision is predicted in second or later transmission of the D2D signal is excluded from resources which become the final resource selection candidate, and thus it is possible to suppress occurrence of collision.

In addition, the selection unit may detect an unoccupied resource in the resource selection time window in accordance with the sensing result, and may select the one or more resource candidates, with which a signal is capable of being transmitted, by excluding the unoccupied resource from the one or more resource candidates, with which a signal is capable of being transmitted, in a case where reception power for a plurality of resources, which are repeated in a transmission interval with the unoccupied resource set as a starting point in a past time direction, satisfies a predetermined condition. According to this, a resource in which occurrence of collision is predicted in second or later transmission of the D2D signal is excluded from resources which become the final resource selection candidate, and thus it is possible to further suppress occurrence of collision.

In addition, the case where the predetermined condition is satisfied may represent a case where a maximum value, an average value, or a minimum value of the reception power for the plurality of resources which are repeated in a transmission interval with the unoccupied resource set as a starting point is equal to or greater than a predetermined threshold value. According to this, a resource in which occurrence of collision is predicted in second or later transmission of the D2D signal is excluded from resources which become the final resource selection candidate, and thus it is possible to suppress occurrence of collision in various methods.

In addition, the selection unit may detect an unoccupied resource in the resource selection time window in accordance with the sensing result, and may exclude the unoccupied resource from the one or more resource candidates, with which a signal is capable of being transmitted, in a case where it is determined that a plurality of resources, which are repeated in a transmission interval with the unoccupied resource set as a starting point in a future time direction, are reserved in accordance with the sensing result. According to this, one resource, which is actually used in data transmission by the user equipment UE becomes a resource capable of realizing data transmission in the subsequent transmission period, and thus it is possible to suppress occurrence of collision.

In addition, according to the embodiment, there is provided a signal transmission method that is executed by a user equipment that selects a resource for signal transmission on the basis of a result of sensing performed in a sensing time window. The method includes: a step of selecting one or more resource candidates, with which a signal is capable of being transmitted, in a resource selection time window subsequent to the sensing time window on the basis of the sensing result and a transmission interval of a signal that is transmitted by the user equipment; and a step of selecting a resource for signal transmission from the one or more resource candidates which are selected and transmitting the signal. According to this signal transmission method, in a mode of selecting a resource for signal transmission on the basis of a sensing result, it is possible to provide a technology capable of suppressing collision of signals.

<Supplement of Embodiment>

The D2D control signal may be referred to as scheduling assignment (SA) or an SCI. The PSCCH includes any control channel as long as the control channel is a control channel for transmission of control information (SCI and the like) that is used in the D2D communication. The PSSCH includes any data channel as long as the data channel is a data channel for transmission of data (MAC PDU and the like) that is used in the D2D communication. The PSDCH includes any data channel as long as the data channel is a data channel for transmission of data (discovery message and the like) that is used in the D2D communication of the D2D discovery.

The aspect and the embodiment which are described in this specification may also be applied to long term evolution (LTE), LTE-Advanced (LTE-A), SUPER 3G, IMT-Advanced, 4G, 5G, future radio access (FRA), W-CDMA (registered trademark), GSM(registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), other systems which use a suitable system, and/or a next generation system that is extended on the basis of the systems.

In the procedure, the sequence, the flowchart, and the like in the aspect and the embodiment which are described in this specification, the order thereof may be changed as long as inconsistency does not occur. For example, with regard to the method that is described in this specification, elements of various steps are suggested in an exemplary order, and there is no limitation to the specific order that is suggested.

The term "determining" that is used in this specification may include various operations. For example, the term "determining" may include regarding of judging, calculating, computing, processing, deriving, investigating, looking up (for example, looking up in a table, a database, or other data structures), or ascertaining as "determined", and the like. In addition, the "determining" may include regarding of receiving (for example, information receiving), transmitting (for example, information transmitting), input, output, or accessing (for example, accessing to data in a memory) as "determined", and the like. In addition, "determining" may include regarding of resolving, selecting, choosing, establishing, comparing, or the like as "determining". That is, "determining" includes regarding of any operation as "determined".

Description of "on the basis of" in this specification does not represent "only on the basis of" unless otherwise stated. In other words, description of "on the basis of" represents both "only on the basis of" and "at least on the basis of".

In a case where "include", "including", and a modification thereof are used in this specification and the appended claims, these terms are intended as comprehensive terms similar to "including (comprising)". In addition, a term ("or") that is used in this specification and the appended claims is not intended as an exclusive logical sum.

In the entirety of the present disclosure, for example, in a case where articles such as "a", "an", and "the" are added in translation, the articles are intended to include a plural form as long as the opposite intention is not clearly indicated from the context.

The specification discloses the following items.

(Item 1)

A user equipment that selects a resource for signal transmission on the basis of a result of sensing that is performed in a sensing time window, the user equipment including:

a selection unit that selects one or more resource candidates with which a signal is capable of being transmitted in a resource selection time window subsequent to the sensing time window on the basis of the sensing result and a transmission interval of a signal that is transmitted by the user equipment; and a transmission unit that selects a resource for signal transmission from the selected one or more resource candidates and transmits the signal.

(Item 2)

The user equipment according to item 1, wherein the selection unit detects an unoccupied resource in the resource selection time window in accordance with the sensing result, and selects the one or more resource candidates, with which a signal is capable of being transmitted, by excluding the unoccupied resource from the one or more resource candidates with which a signal is capable of being transmitted in a case where reception power of a resource one transmission interval before the unoccupied resource in a past time direction, is equal to or greater than a predetermined threshold value.

(Item 3)

The user equipment according to item 1, wherein the selection unit detects an unoccupied resource in the resource selection time window in accordance with the sensing result, and selects the one or more resource candidates, with which a signal is capable of being transmitted, by excluding the unoccupied resource from the one or more resource candidates, with which a signal is capable of being transmitted, in a case where reception power of each of a plurality of resources, which are repeated at a transmission interval with the unoccupied resource set as a starting point in a past time direction, satisfies a predetermined condition.

(Item 4)

The user equipment according to item 3, wherein the case where the predetermined condition is satisfied represents a case where a maximum value, an average value, or a minimum value of the reception power of each of the plurality of resources which are repeated at a transmission interval with the unoccupied resource set as a starting point is equal to or greater than a predetermined threshold value.

(Item 5)

The user equipment according to item 1, wherein the selection unit detects an unoccupied resource in the resource selection time window in accordance with the sensing result, and excludes the unoccupied resource from the one or more resource candidates, with which a signal is capable of being transmitted, in a case where it is determined that a plurality of resources, which are repeated at a transmission interval with the unoccupied resource set as a starting point in a future time direction, are reserved in accordance with the sensing result.

(Item 6)

A signal transmission method that is executed by a user equipment that selects a resource for signal transmission on the basis of a result of sensing performed in a sensing time window, the method including:

a step of selecting one or more resource candidates, with which a signal is capable of being transmitted, in a resource selection time window subsequent to the sensing time window on the basis of the sensing result and a transmission interval of a signal that is transmitted by the user equipment; and a step of selecting a resource for signal transmission from the selected one or more resource candidates and transmitting the signal.

Hereinbefore, the invention has been described in detail, but it is apparent by those skilled in the art that the invention is not limited to the above-described embodiment in this specification. The invention can be executed a variation aspect and a modification aspect without departing from the gist or the scope of the invention which is determined by description of the appended claims. Accordingly, description in this specification is made for exemplary explanation, and does not have any limiting meaning with respect to the invention.

This patent application claims the benefit of Japanese Priority Patent Application JP 2016-158269 filed Aug. 10, 2016, and the entire contents of the Patent Application JP 2016-158269 are incorporated herein by reference.

EXPLANATIONS OF LETTERS OR NUMERALS

UE User equipment
eNB Base station
101 Signal transmission unit
102 Signal reception unit
103 Sensing unit
104 Selection unit
201 Signal transmission unit
202 Signal reception unit
203 Notification unit
1001 Processor
1002 Memory
1003 Storage
1004 Communication device
1005 Input device
1006 Output device

The invention claimed is:

1. A user equipment comprising:
a processor that selects, based on a result of sensing performed based on physical sidelink control channel (PSCCH) decoding and measurement of reception power in a first time window and on a transmission interval of a signal, one or more resource candidates in a second time window after the first time window; and
a transmitter that selects a resource for transmitting a signal from the selected one or more resource candidates, and transmits the signal,
wherein the processor detects an unoccupied resource in the second time window, and excludes the unoccupied resource from the one or more resource candidates based on a predetermined condition on reception power of each of a plurality of resources that are repeated at a transmission interval with the unoccupied resource as a starting point in a past time direction with respect to the second time window.

2. The user equipment as claimed in claim 1, wherein whether the predetermined condition is satisfied or not is determined based on an average value of the reception power of each of a plurality of resources that are repeated at a transmission interval with the unoccupied resource as a starting point.

3. A signal transmission method executed by a user equipment comprising:
selecting, based on a result of sensing performed based on physical sidelink control channel (PSCCH) decoding and measurement of reception power in a first time window and on a transmission interval of a signal, one or more resource candidates in a second time window after the first time window; and
selecting a resource for transmitting a signal from the selected one or more resource candidates;
transmitting the signal;
detecting an unoccupied resource in the second time window; and
excluding the unoccupied resource from the one or more resource candidates based on a predetermined condition on reception power of each of a plurality of resources that are repeated at a transmission interval with the unoccupied resource as a starting point in a past time direction with respect to the second time window.

* * * * *